(12) United States Patent
Ikeda

(10) Patent No.: US 7,445,360 B2
(45) Date of Patent: Nov. 4, 2008

(54) LENS COMPONENT, INDICATOR UNIT FOR SIGNAL INDICATING LIGHT, AND SIGNAL INDICATING LIGHT

(75) Inventor: Akito Ikeda, Yao (JP)

(73) Assignee: Patlite Corporation, Osaka (JP)

( * ) Notice: Subject to any disclaimer, the term of this patent is extended or adjusted under 35 U.S.C. 154(b) by 106 days.

(21) Appl. No.: 11/204,265

(22) Filed: Aug. 12, 2005

(65) Prior Publication Data
US 2006/0044814 A1 Mar. 2, 2006

(30) Foreign Application Priority Data
Sep. 2, 2004 (JP) ............... 2004-256181
Feb. 8, 2005 (JP) ............... 2005-032102

(51) Int. Cl.
*F21V 5/00* (2006.01)
(52) U.S. Cl. .................. 362/332; 362/268; 362/555
(58) Field of Classification Search ................. 362/27, 362/237, 244, 268, 332, 338, 511, 521, 555; 340/815.4, 815.45, 815.49, 815.5, 815.74
See application file for complete search history.

(56) References Cited
U.S. PATENT DOCUMENTS
5,642,933 A 7/1997 Hitora 6,443,582 B1 * 9/2002 Tarne et al. ............... 362/27
2004/0047161 A1 * 3/2004 Mochizuki et al. ......... 362/511

* cited by examiner

*Primary Examiner*—Anabel Ton
*Assistant Examiner*—Jason Moon Han
(74) *Attorney, Agent, or Firm*—William L. Androlia; H. Henry Koda

(57) ABSTRACT

A lens component includes: a light incident portion (16) having an incident face (14) upon which light from a light source (6) is incident, the light source (6) being disposed at a light source position (15); and a plurality of plate-like light guiding portions (17, 32) disposed radially around an axis (S0) passing through the light source position (15) or a position in the vicinity thereof, and arranged to guide light incident from the incident face (14) of the light incident portion (16), in emission directions (F, F1-F3) at right angles to the axis (S0). Each of the plate-like light guiding portions (17, 32) is provided on an end face (27) thereof with a radial reflecting face (29, 29A, 29B) for internally reflecting, in the emission directions (F, F1-F3), the light incident from the incident face (14) of the light incident portion (16). Further, each of the plate-like light guiding portions (17, 32) has a pair of main surfaces (25) forming a pair of light guiding and reflecting surfaces which extend substantially in parallel to the predetermined axis (S0) and which guide, as internally reflecting, the light incident from the incident face (14) in the emission directions (F, F1-F3).

4 Claims, 22 Drawing Sheets

LENS COMPONENT, INDICATOR UNIT FOR SIGNAL INDICATING LIGHT, AND SIGNAL INDICATING LIGHT

BACKGROUND OF THE INVENTION

1. Field of the Invention

The present invention relates to (i) a signal indicating light to be disposed at automatic machines, production lines, parking areas, danger spots and the like for signal-indicating any of a variety of states such as lack of material, clogging by work pieces, full parking, dangers and the like, (ii) an indicator unit for the signal indicating light, and (iii) a lens component to be used for the signal indicating light and the like.

2. Description of Related Art

A conventional signal indicating light has, for example, a light source and a reflecting member for reflecting light from the light source. A case-like globe covering the light source, the reflecting member and the like, is formed separately from the reflecting member. Formed on the surface of the globe is a diffusing lens for diffusing the transmitted light (See U.S. Pat. No. 5,642,933 for example).

Light from the light source reaches, directly or as reflected by the reflecting member, the indicating portion at the globe outer periphery. The light is directed in multiple directions by the diffusing lens of the globe outer periphery. Provision is made such that light in multiple directions is emitted from the globe and reaches a broad surrounding area. Further, the light is collected to the globe to cause people around the globe to facilitate to recognize the light.

In the signal indicating light of U.S. Pat. No. 5,642,933, however, the reflecting member and the diffusing lens for enhancing the visibility are separated from each other, thus increasing the number of component elements. This results in increase in the assembling cost of the signal indicating light.

Further, it is desired to further enhance the visibility of the signal indicating light.

SUMMARY OF THE INVENTION

It is an object of the present invention to provide (i) a lens component capable of not only reducing the number of component elements but also assuring a high visibility when used in a signal indicating light for example, (ii) a signal indicating light indicator unit using this lens component, and (iii) a signal indicating light using this lens component.

A lens component according to the present invention comprises: a light incident portion having an incident face upon which light from a light source is incident, the light source being disposed at a predetermined light source position; and a plurality of plate-like light guiding portions disposed radically around a predetermined axis passing through the light source position or a position in the vicinity thereof, and arranged to guide light incident from the incident face of the light incident portion in emission directions intersecting the predetermined axis, each of the plate-like light guiding portions being provided on an end face thereof with a radial reflecting face for internally reflecting, in the emission directions, the light incident from the incident face of the light incident portion, and each of the plate-like light guiding portions having a pair of main surfaces serving as a pair of light guiding and reflecting surfaces which extend substantially in parallel to the predetermined axis and which guide, as internally reflecting, the light incident from the incident face in the emission directions.

According to the present invention, when a light source is disposed at the light source position of the lens component and the light source emits light, the light can be emitted in the emission directions through the light incident portion and the plate-like light guiding portions. In the plate-like light guiding portions, at least a portion of the light is internally reflected by the radial reflecting faces and the pairs of light guiding and reflecting surfaces, and is guided and collected, between the pairs of light guiding and reflecting surfaces, in the emission directions, and is directed in multiple directions. Accordingly, this lens component can be applied, for example, to a signal indicating light for emitting light in the emission directions. In the signal indicating light, a light signal can readily be recognized in a broad surrounding area, thus providing a high visibility. Further, both the radial reflecting faces and the light guiding and reflecting surfaces required for a signal indicating light, are made in a unitary structure with the plate-like light guiding portions. This reduces the number of component elements, resulting in reduction of, for example, the assembling cost of the signal indicating light.

According to the present invention, the radial reflecting face may comprise a plurality of radial reflecting faces made in the form of stairs. According to the arrangement above-mentioned, the light from the light source can be dispersed and reflected by the plurality of radial reflecting faces. For example, provision can be made such that light from a single light source is emitted from a plurality of portions of the lens component. This contributes to improvement in visibility.

The present invention may further comprise joint portions each of which connects the radial outer edges of adjacent plate-like light guiding portions to each other. According to the arrangement above-mentioned, the lens component can be reinforced by the joint portions, and can therefore be handled more easily.

According to the present invention, the light source position may comprise a plurality of light source positions located on a flat plane at right angles to the predetermined axis. According to the arrangement above-mentioned, the visibility can be enhanced by a large light amount obtained with the use of the plurality of light sources. Further, the plurality of light sources can be disposed in the vicinity of one another on a common flat plane, thus facilitating the assembling.

According to the present invention, the radial reflecting faces and the pairs of main surfaces are preferably total-reflection faces for totally reflecting the light. According to the arrangement above-mentioned, the light can efficiently be guided, thus contributing to improvement in visibility.

A signal indicating light indicator unit of the present invention comprises: at least one of the lens components above-mentioned according to the present invention; and a light source disposed at the light source position of the lens component. According to this invention, both improvement in visibility and reduction in the number of component elements can be achieved in the signal indicating light indicator unit.

In the signal indicating light indicator unit of the present invention, the lens component may have a basic external shape equivalent to a divided body obtained by dividing a post-like body of which axis is parallel to the predetermined axis, into a plurality of portions in a circumferential direction, and a plurality of such lens components may be joined together in the circumferential direction. According to the arrangement above-mentioned, a large indicator unit can be formed with the use of a plurality of small lens components.

A signal indicating light indicator unit according to the present invention may have a basic external shape equivalent to a post-like body of which axis is parallel to the predetermined axis, or may have a basic external shape equivalent to a divided body obtained by dividing such a post-like body into a plurality of portions in a circumferential direction. According to the arrangement above-mentioned, there can readily be formed a signal indicating light in the form of the post-like body above-mentioned or in the form of the divided body above-mentioned.

A signal indicating light according to the present invention, has the signal indicating light indicator unit above-mentioned. According to this invention, both improvement in visibility and reduction in the number of component elements can be achieved in the signal indicating light.

The foregoing and other elements, features, steps, characteristics and advantages of the present invention will become more apparent from the following detailed description of the preferred embodiments with reference to the attached drawings.

BRIEF DESCRIPTION OF THE DRAWINGS

FIG. 7A is a schematic view of the indicator unit according to the first preferred embodiment of the present invention, illustrating the light emitting state thereof, while

DESCRIPTION OF THE PREFERRED EMBODIMENTS

In preferred embodiments discussed in the following, the description is made of the case in which a lens component is applied to an indicator unit for a signal indicating light, but the lens component may also be applied to, for example, an illumination apparatus or the like.

Figure 1:
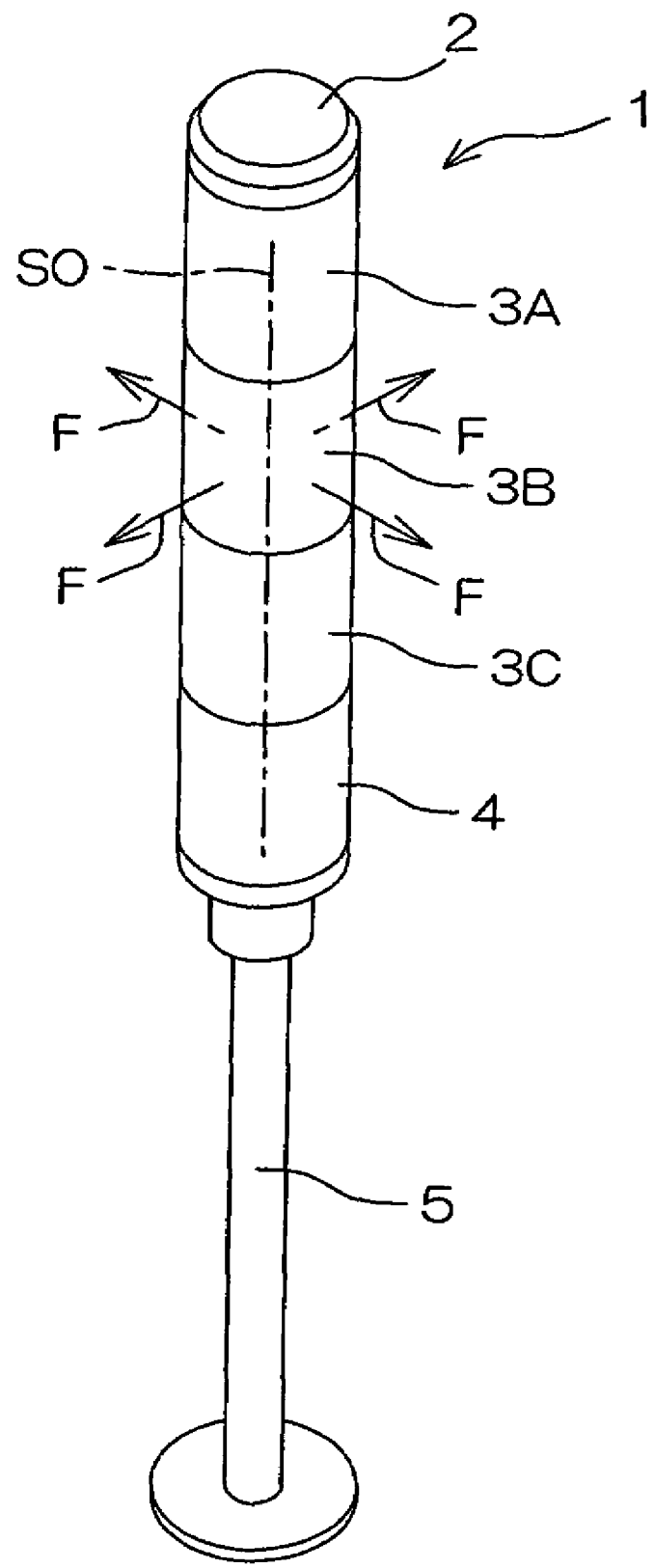
FIG. 1 is a perspective view illustrating a schematic arrangement of a signal indicating light according to a first preferred embodiment of the present invention.

FIG. 1 is a perspective view illustrating a schematic arrangement of a signal indicating light according to a first preferred embodiment of the present invention.

A signal indicating light 1 has a post-like body long in one direction, and is installed, for example, with its longitudinal direction extending in the vertical direction. The signal indicating light 1 may also be installed with its longitudinal direction extending in other direction than the vertical direction.

The signal indicating light 1 has a cover 2 disposed at the top of the signal indicating light 1, a plurality of, for example three, indicator units 3A, 3B, 3C for emitting light signals, and a base unit 4 disposed at the base of the signal indicating light 1 for supplying electric power to the indicator units 3A, 3B, 3C. The signal indicating light 1 is formed by connecting the cover 2, the indicator units 3A, 3B, 3C and the base unit 4 to one another in stack in the longitudinal direction. Disposed at the end of the base unit 4 is a mounting member 5 formed by a support for mounting the signal indicating light 1 to a mounting spot (e.g., the main body of an automatic machine) (not shown).

Each of the cover 2, the indicator units 3A; 3B, 3C and the base unit 4 has a substantially column shape. When these members are vertically stacked on one another, the axes SO of the respective column-shape members are aligned with one another, and extend along the longitudinal direction of the signal indicating light 1. The longitudinal direction corresponds to the stackable direction.

Each of the indicator units 3A, 3B, 3C has a similar arrangement and indicates a light signal. For example, the light signals are emitted in all directions around the axes SO along emission directions F crossing the axis SO of the signal indicating light 1.

As an example of the emission directions F, FIG. 1 and other figures show the directions at right angles to the axes SO. FIG. 1 shows the case Where three indicator units 3A, 3B, 3C are stacked on one another in the vertical direction. The following description will be made in this arrangement with the indicator unit 3B centered.

Figure 2:
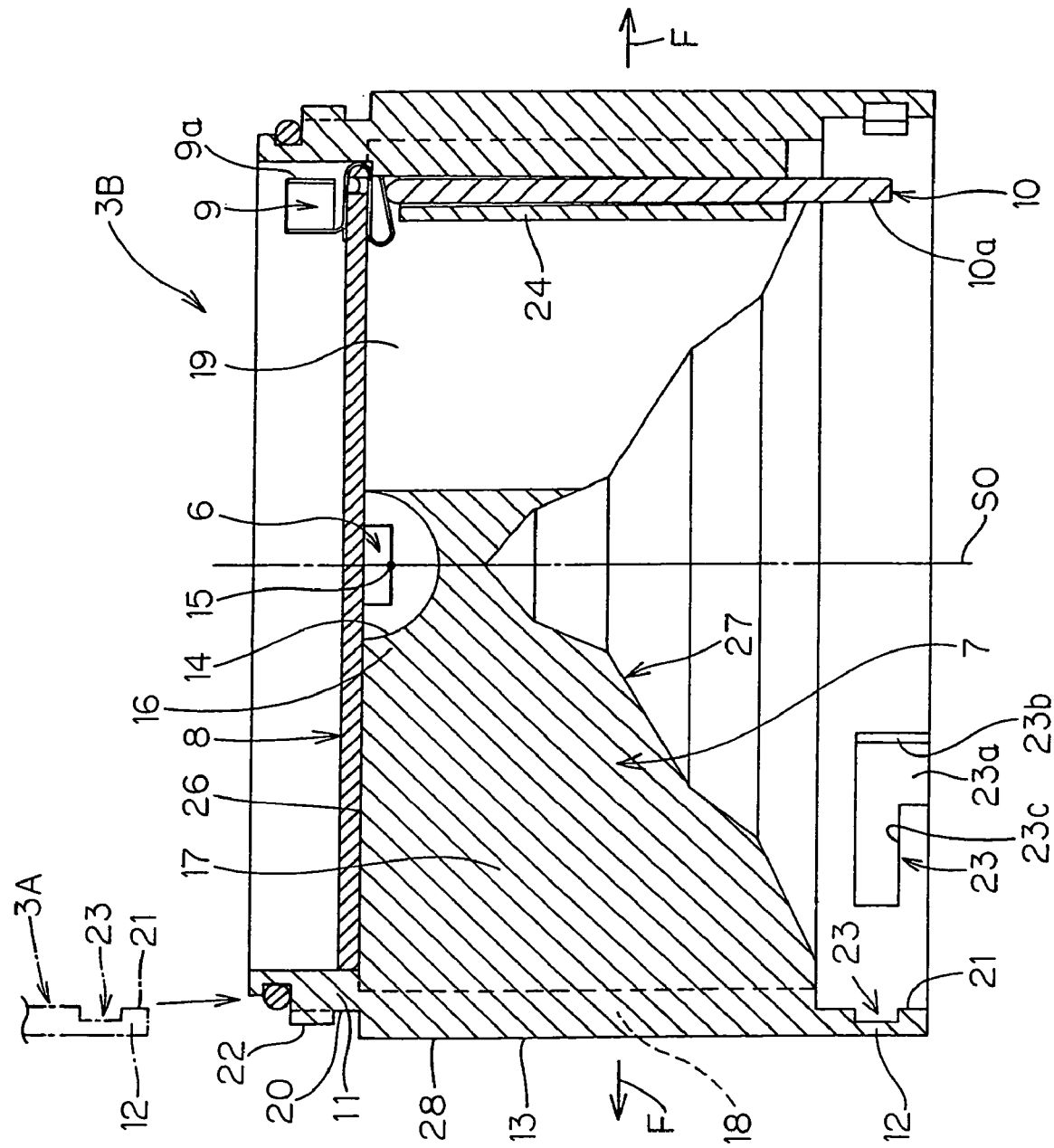
FIG. 2 is a section view of an indicator unit of the signal indicating light in FIG. 1.
Figure 3:
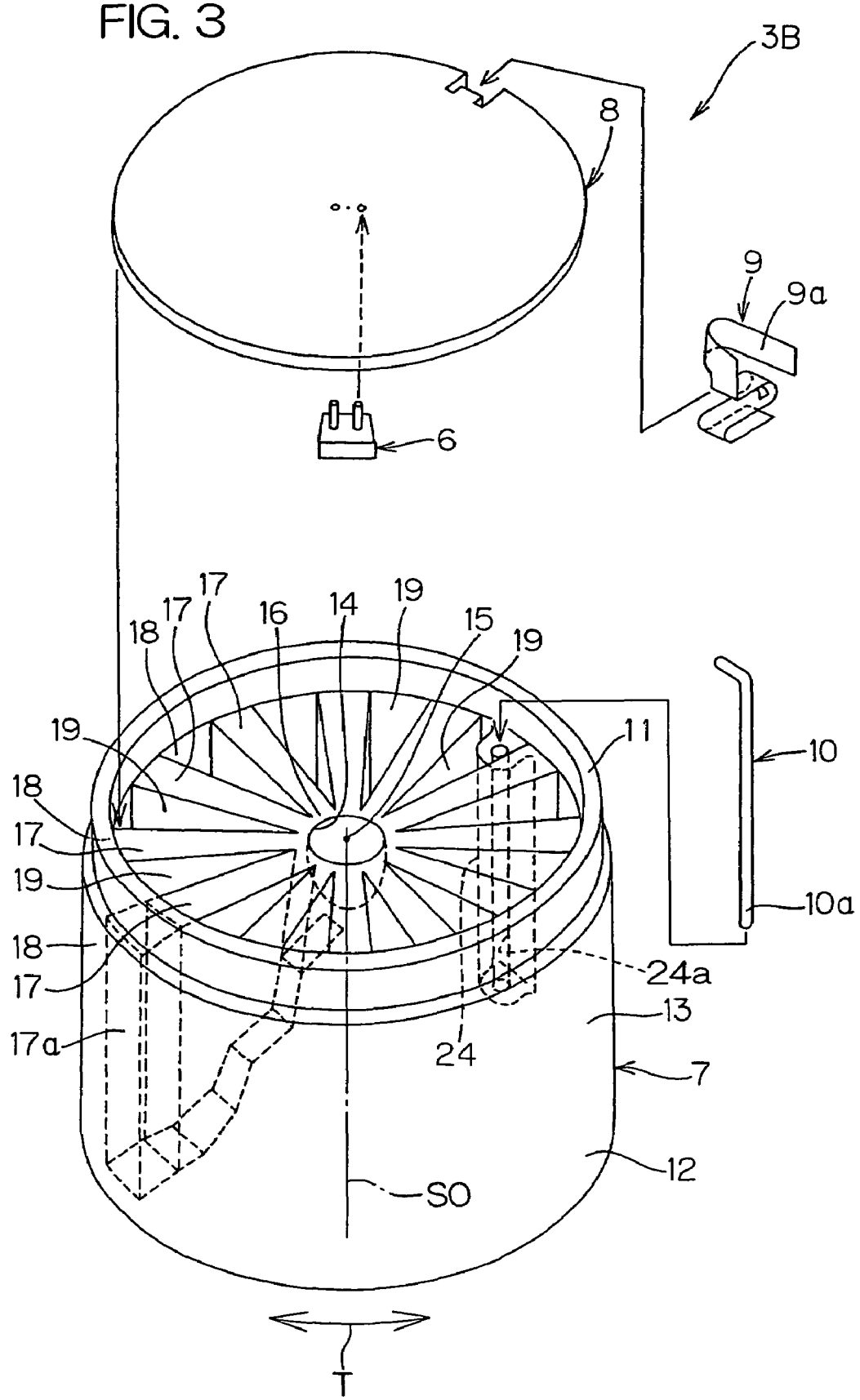
FIG. 3 is an exploded perspective view of the indicator unit shown in FIG. 2.

FIG. 2 is a section view of the indicator unit 3B of the signal indicating light 1 in FIG. 1. FIG. 3 is an exploded perspective view of the indicator unit 3B shown in FIG. 2. The following description will be made with reference to FIGS. 2 and 3.

The indicator unit 3B has a light source 6 for emitting light, a lens component 7 for guiding the light from the light source 6 to the emission directions F above-mentioned, a circuit substrate 8 for supporting the light source 6, and a plurality of pairs of first and second feeding members 9, 10 (only one pair is shown) for feeding electric power to the light source 6. In this preferred embodiment, each of the light source 6, the lens component 7 and the circuit substrate 8 is a single component.

The light source 6 is formed by a light emitting diode device (also referred to as an LED). This LED has a case (not shown), and a single light emitting element chip (not shown) held in the case.

The circuit substrate 8 includes a printed circuit board (not shown) forming a part of a circuit (not shown) for feeding electric power to the light source 6. With the light source 6 and the first feeding member 9 electrically connected to the circuit of the printed circuit board, the light source 6 and the first feeding member 9 are fixed to the printed circuit board. The light source 6, the circuit substrate 8 and the first feeding member 9 form a circuit substrate assembly. The circuit substrate 8 of the circuit substrate assembly is fixed to the lens component 7.

The basic external shape or approximate external shape of the lens component 7 is a body of revolution and a column body in the form of a post-like body. This column body has an axis aligned with the axis SO. In the following description, the extending direction of the axis SO of the basic external shape of the lens component 7, is also referred to as the axial direction, a radial direction of the column body is also referred to simply as the radial direction, and the circumferential direction of the column body is also referred to simply as the circumferential direction T.

The lens component 7 has an upper end portion 11 as one end in the axial direction, a lower end portion 12 as the other end in the axial direction, and an outer periphery 13. The external shape of the lens component 7 forms the external shape of the indicator unit 3B. The lens component 7 is made of a light transmitting material. Examples of the light transmitting material include a methacrylic resin, glass and the like.

The lens component 7 is provided in the upper end portion 11 at its center in plan view with a concave portion 14. The concave portion 14 has a semi-spherical shape, of which center is positioned on the axis SO. Set at the center position of the semi-spherical shape is a light source position 15 at which the light source 6 is disposed.

The lens component 7 has a light incident portion 16, a plurality of plate-like light guiding portions 17 (only a portion being shown), a plurality of joint portions 18 (only a portion being shown). The light incident portion 16, the plurality of plate-like light guiding portions 17 and the plurality of joint portions 18, are made in a unitary structure.

The light incident portion 16 is arranged to enter, into the inside of the lens component 7, light from the light source 6 disposed at the light source position 15. The light incident portion 16 forms the peripheral edge portion of the concave portion 14 and is disposed at the radial inward part of the lens component 7. The plurality of plate-like light guiding portions 17 are disposed around the light incident portion 16 and radically outwardly extend there from. Each of the joint portions 18 is disposed at a radial outer part of the lens component 7, and connects, to each other, the outer edge portions 17a of adjacent two plate-like light guiding portions 17 which extend in the emission directions F. The outer edge portions 17a of the plate-like light guiding portions 17, and the joint portions 18, are alternately disposed in the circumferential direction T. Thus, the outer periphery 13 of the lens component 7 is made in a cylindrical shape. The outer periphery 13 is made, for example, in a cylindrical shape which is free from local undulations and which smoothly and continuously extends in the circumferential direction T.

Each space 19 opened in the axial direction is defined by the light incident portion 16, two plate-like light guiding portions 17 adjacent in the circumferential direction T, and the corresponding joint portion 18.

The lens component 7 serves as a support member for supporting the circuit substrate 8 and the second feeding member 10, and also serves as a globe of the indicator unit 3B. The globe is a member for housing the light source 6, the circuit substrate 8 and the like which are the internal component elements of the indicator unit 3B. The external shape of the globe forms the external shape of the indicator unit 3B.

The lens component 7 as the globe supports the circuit substrate 8 at the upper end portion 11. The circuit substrate 8 thus supported covers the concave portion 14 of the lens component 7. The concave portion 14 houses the light source 6 as connected to the circuit substrate 8. In such a condition, the light source 6, more specifically the LED element chip, is disposed at the light source position 15. When the indicator units 3A, 3B, 3C, the base unit 4 and the cover 2 are stacked on one another, the lens component 7 houses the internal component elements of the indicator unit 3B such as the light source 6, the circuit substrate 8 and the like such that these internal component elements are not exposed to the outside.

Provision is made such that the lens component 7 is mechanically connectable to the lens components 7 of other indicator units 3A, 3C when the indicator units 3A, 3B, 3C are stacked on one another. For mechanical connection, the lens component 7 of the indicator unit 3B is provided at the upper end portion 11 with a fitting surface 20 formed by an outward-turned cylindrical surface serving as a first joint portion, and is also provided at the lower end portion 12 with a fitting surface 21 formed by an inward-turned cylindrical surface serving as a second joint portion.

A convex portion 22 as a retaining engagement portion is formed on the fitting surface 20 at its predetermined position in the circumferential direction T. A concave portion 23 as a retaining engagement portion is formed on the fitting surface 21 at its predetermined position in the circumferential direction T. The concave portion 23 has, at the lower end portion 12 of the lens component 7, an inlet portion 23a opened in the axially downward direction, a first groove 23b axially extending from the inlet portion 23a, and a second groove 23c extending in the circumferential direction T from the inner part of the first groove 23b.

For example, when the indicator units 3A, 3B are axially moved relatively to each other with the fitting surface 20 of the indicator unit 3B and the fitting surface 21 of the indicator unit 3A fitted to each other and with the convex portion 22 of the indicator unit 3B and the concave portion 23 of the indicator unit 3A mutually adjusted in position, the convex portion 22 can be moved into the inner part of the concave portion 23 from the inlet portion 23a thereof. Then, by relatively rotating the two indicator units 3A, 3B around the axes SO, the convex portion 22 can be moved into the second groove 23c of the concave portion 23 such that the convex portion 22 is engaged with the peripheral edge of the second groove 23c. Thus, the indicator units 3A, 3B are connected to each other such that the indicator unit 3B is not pulled out from the indicator unit 3A. In a similar manner, the fitting surface 21 of the indicator unit 3B can be connected to the fitting surface 20 of the indicator unit 3C such that the indicator unit 3B is not pulled out from the indicator unit 3C.

Each pair of the first and second feeding members 9, 10 are electrically connected to each other. The first feeding member 9 has a first terminal portion 9a disposed as corresponding to the upper end portion 11 of the lens component 7. The first terminal portion 9a is formed by a metallic resilient tongue piece as a conductor.

The second feeding member 10 is formed by a metallic wire as a conductor. This wire extends between the upper end portion 11 and the lower end portion 12 of the lens component 7, and is provided at its lower end with a rod-like second terminal portion 10a. The second feeding member 10 is held by a holding portion 24 of the lens component 7.

The holding portion 24 is formed in a tube shape and made in a unitary structure with the corresponding joint portion 18. The holding portion 24 has a hole 24a in which the second feeding member 10 passes. The holding portion 24 is disposed in the space 19 above-mentioned. A light signal (light from the light source 6) hardly passes through the space 19, which is a vacant space. When the second feeding members 10 as feeding members are disposed in at least a portion of the spaces 19, the indicator unit 3B can be miniaturized, yet restraining the visibility from being lowered.

With the indicator units 3A, 3B, 3C disposed in stack and connected to one another, the first terminal portions 9a of the indicator unit 3B are resiliently connected to the corresponding second terminal portions 10a of the indicator unit 3A, and the second terminal portions 10a of the indicator unit 3B are resiliently connected to the corresponding first terminal portions 9a of the indicator unit 3C. Thus, there is formed a circuit for generating a light signal with the units 3A, 3B, 3C, 4 of the signal indicating light 1 electrically connected to one another.

Figure 4:
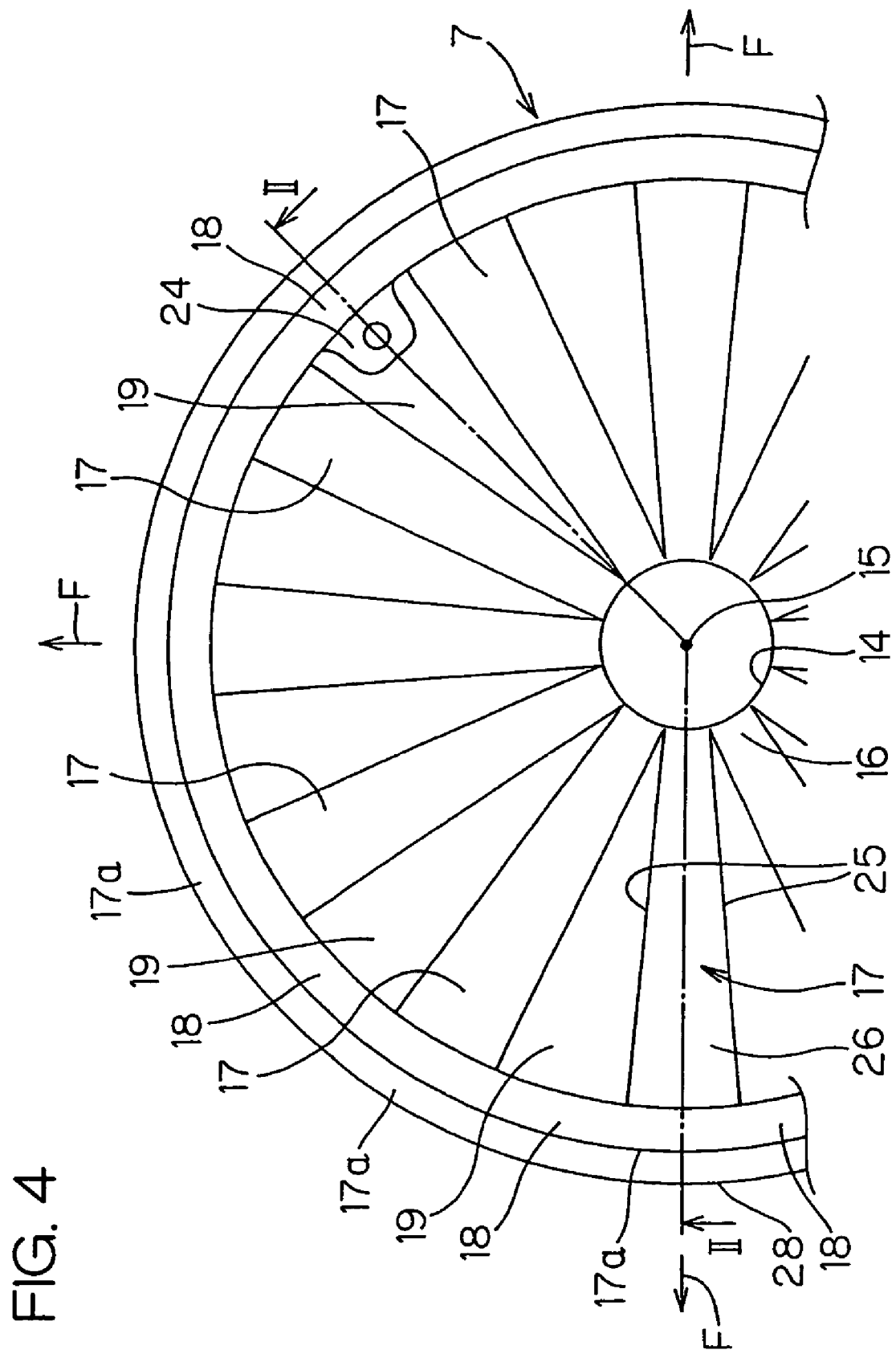
FIG. 4 is a plan view of the lens component in FIG. 2.
Figure 5:
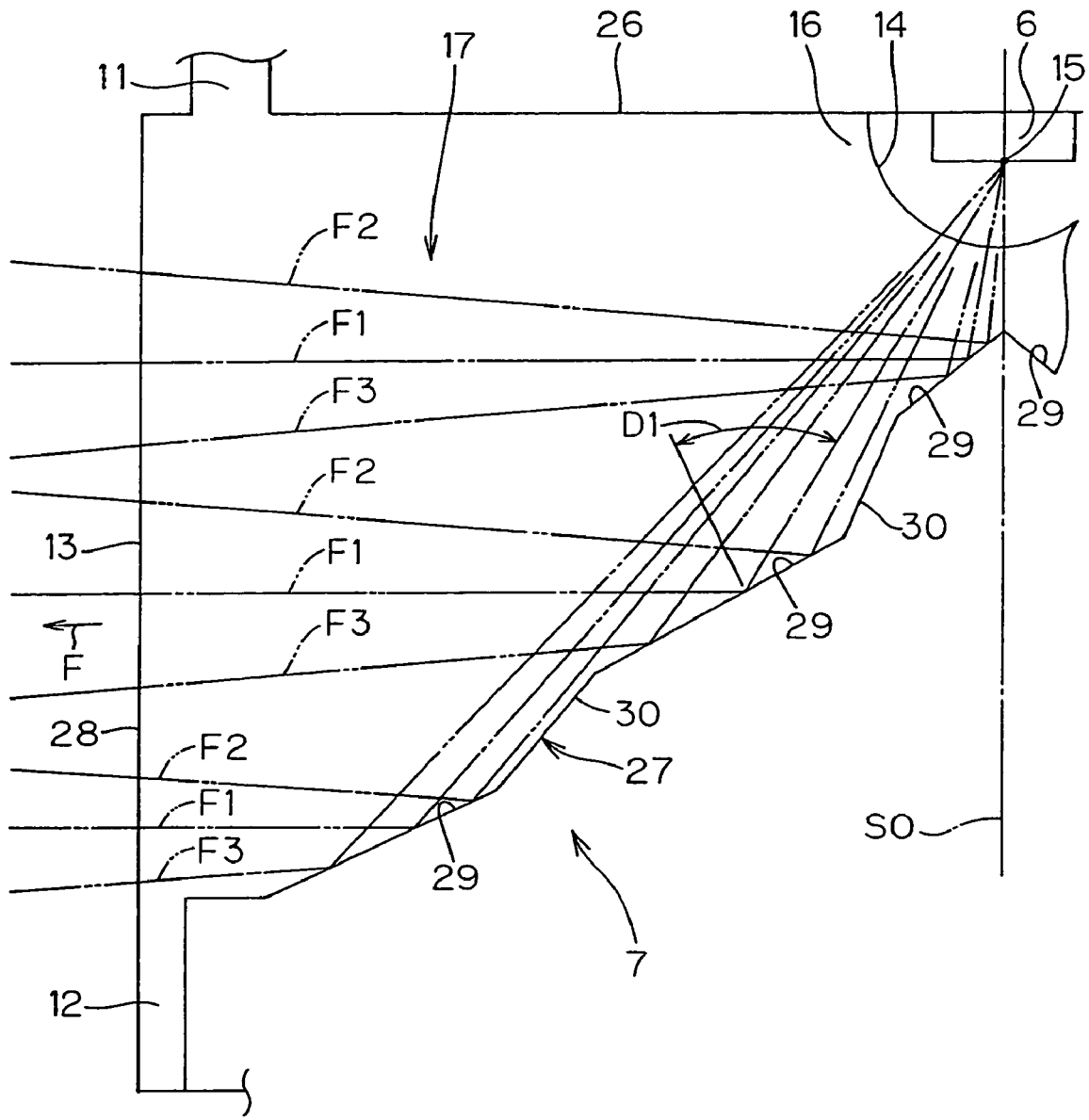
FIG. 5 is a section view of a plate-like light guiding portion of the lens component in FIG. 2, with hatching lines omitted.

FIG. 4 is a plan view of the lens component 7. FIG. 5 is a section view of a plate-like light guiding portion 17 of the lens component 7 with hatching lines omitted. The following description will be made with reference to FIGS. 4 and 5.

The light incident portion 16 of the lens component 7 is formed by the peripheral edge portion of the concave portion 14. The concave portion 14 serves as an incident face upon which light from the light source 6 disposed at the light source position 15, is incident. The strongest light ray out of light rays from the light source 6, is emitted along the axis SO toward the downward side, as one side, with respect to the light source position 15.

According to this preferred embodiment, the incident face covers that side below the light source 6 from which light is emitted. Accordingly, when the light source 6 is an LED or the like, a major portion of the light can be incident, enabling the light to be efficiently utilized. When at least a portion of normal lines of the incident face, preferably the normal lines in the entire zone as in the preferred embodiment, passes through the light source position 15, the light from the light source 6 can efficiently be transmitted with no refraction. The light incident portion 16 is shared with the plate-like light guiding portions 17.

The plate-like light guiding portions 17 have the same shape and are made in the form of a plate having a predetermined thickness. The plate-like light guiding portions 17 are radically disposed around the axis SO in plan view. The thickness direction of the plate shape of each plate-like light guiding portion 17 extends in the circumferential direction T. The main surfaces 25 of each plate shape extend substantially axially and radically. The plate-like light guiding portions 17 are arranged to guide light incident from the concave portion 14 to the emission directions F.

Each plate-like light guiding portion 17 has a pair of main surfaces 25 opposite to each other in the circumferential direction T, a first end face 26 near to the upper end portion 11, a second end face 27 which is nearer to the lower end portion 12 than to the first end face 26 and which is opposite to the first end face 26, and a third end face 28 forming a portion of the outer periphery 13 of the lens component 7.

Each first end face 26 is formed on a flat plane at right angles to the axis SO and comes in contact with the circuit substrate 8 to regulate the axial position of the light source 6 through the circuit substrate 8. Accordingly, when the light source 6 is a point light source, the direction of light from the light source 6 can be accorded with the normal-line direction of the incident face of the light incident portion 16.

The second end face 27 extends inclined with respect to the axis SO from a position near to the upper end portion 11 and in the vicinity of the axis SO to a position near to the lower end portion 12 and in the vicinity of the outer periphery 13.

The second end face 27 has (i) a plurality of radial reflecting faces 29 for internally reflecting the light incident from the concave portion 14 along the emission directions F in directions away from the axis SO, and (ii) a plurality of connecting faces 30 for connecting these radial reflecting faces 29 at separate points in the axial direction. The radial reflecting faces 29 are disposed in the form of stairs through the connecting faces 30.

According to the preferred embodiment, the radial reflecting faces 29 form bodies of revolution around the axis SO, and the sectional shape of each body taken along the axial direction is a non-parabola, e.g., a circular conical surface shape. In each circular conical surface shape, the lateral sides are defined by straight lines, and the straight lines inclined cross the axis SO. Further, the top of each circular conical surface shape is located at a lower side, as one side, with respect to the light source position 15

More specifically, each radial reflecting face 29 reflects, at the center thereof in the axial direction, light from the light source 6 in emission directions F1 at right angles to the axis SO. At a portion axially upper than the axial center portion, light from the light source 6 is reflected in emission directions F2 directed upwardly with respect to the emission directions F1 which are at right angles to axis SO. At a portion axially lower than the axial center portion, light from the light source 6 is reflected in emission directions F3 directed downwardly with respect to the emission directions F1 which are at right angles to axis SO.

When the sectional shapes of the radial reflecting faces 29 taken along the axial direction, include shapes forming a non-parabola, light from the light source 6 at the light source position 15 can be reflected in multiple directions. This contributes to improvement in visibility in the surrounding broad area.

The sectional shapes of the radial reflecting faces 29 taken along the axial direction, may be shapes forming a parabola. As the case where the sectional shapes of the radial reflecting faces 29 taken along the axial direction, form a parabola, there may be for example considered a case in which the radial reflecting faces 29 form a body of revolution around the axis SO, in which the focal point of the parabola is identical with the light source position 15, and in which the symmetry axis of the parabola of the sectional shape extends along the radial direction. In this case, the radial reflecting faces 29 reflect light from the light source 6 disposed at the light source position 15, causing the light to be parallel to the radial directions, and this parallel light can be emitted in the all directions around the axis SO.

Provision is made such that at least a portion of the radial reflecting faces 29, preferably all the radial reflecting faces 29, totally reflect, at least a partial zone thereof, preferably at the whole zone thereof, the direct light from the light source 6 disposed at the light source position 15, preferably also the light reflected by the main surfaces 25 in addition to this direct light. More specifically, the incident angle D1 which is formed by the normal line of each radial reflecting face 29 and incident light (for example, direct light), is set in the range which exceeds the critical angle of total reflection in each radial reflecting face 29 of the lens component 7 and which is not greater than 90°.

The connecting faces 30 have, for example, circular conical surface shapes of which lateral side lines in section inclined cross the axis SO, and the tops of the circular conical surfaces coincide with the light source position 15.

Figure 6:
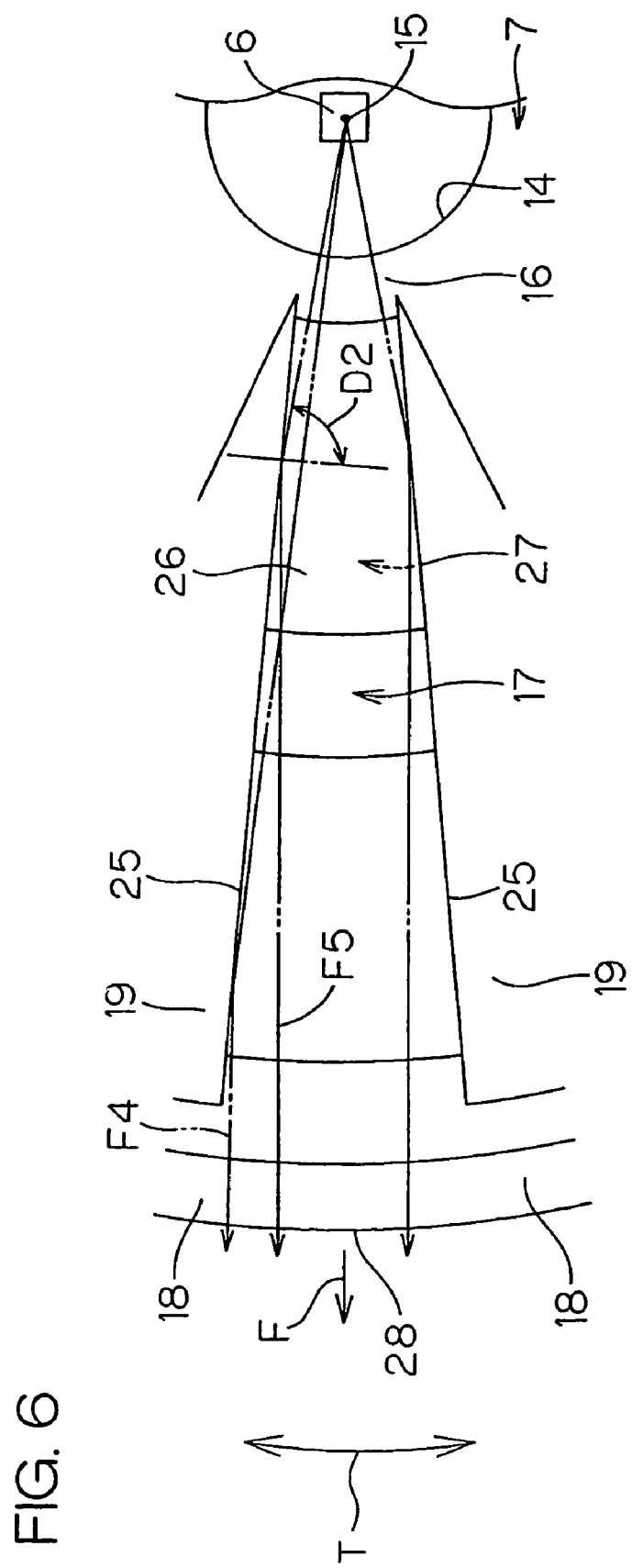
FIG. 6 is a plan view of a plate-like light guiding portion of the lens component in FIG. 2.

FIG. 6 is a plan view of a plate-like light guiding portion 17 of the lens component 7. The following description will be made with reference to FIGS. 3 and 6.

Each pair of main surfaces 25 are plane surfaces which are flat and which extend substantially in the axial direction. More specifically, in plan view, each pair of main surfaces 25 are inclined at a predetermined equal angle in the mutually reverse directions with respect to the radial direction such that each pair of main surfaces 25 are gradually away from each other in the radically outward direction.

The inclination angle of each pair of main surfaces 25 in the radial directions, is set as follows. In plan view, an imaginary extension straight line of one main surface 25 crosses an imaginary extension straight line of the other main surface 25 at the opposite side with respect to the axis SO.

When the lens component 7 is made of a molded article, each main surface 25 may be inclined, in a section taken as crossing the radial directions, with respect to the axis SO at an angle corresponding to a pulling gradient of the mold.

Each pair of main surfaces 25 serve as a pair of light guiding and reflecting surfaces for guiding, while internally reflecting, light incident from the concave portion 14 in the emission directions F. For example, each pair of main surfaces 25 internally reflect, in the radically outward direction, direct light from the light source 6 disposed at the light source position 15. Each one main surface 25 is arranged to reflect the internally reflected light in a direction which crosses the radial directions and which is nearer to the other main surface 25 than to the radial directions.

In each main surface 25, the internally reflected light directions are different from one another dependent on the radial positions. For example, on the upper main surface 25 in FIG. 6, the direct light from the light source 6 is reflected in a relatively leftward upward direction F4 in FIG. 6 as the reflection point is located in a radically outward or leftward side in FIG. 6. On the other hand, the direct light from the light source 6 is reflected in a relatively leftward downward direction F5 in FIG. 6 as the reflection point is located in a radically inward or rightward side in FIG. 6.

Provision is made such that at least one main surfaces 25, preferably the whole pairs of main surfaces 25, totally reflect, at least partial zones thereof, preferably at the whole zones thereof, the direct light from the light source 6 disposed at the light source position 15, preferably also light reflected by the radial reflecting faces 29 in addition to the direct light. This enhances the visibility of the signal indicating light 1.

More specifically, for total reflection, the incident angle D2 which is formed by the normal line of each main surface 25 in the total reflection zone and incident light (for example, direct light), is set in the range which exceeds the critical angle of total reflection in each main surface 25 of the lens component 7 and which is not greater than 90°.

Figure 7A:
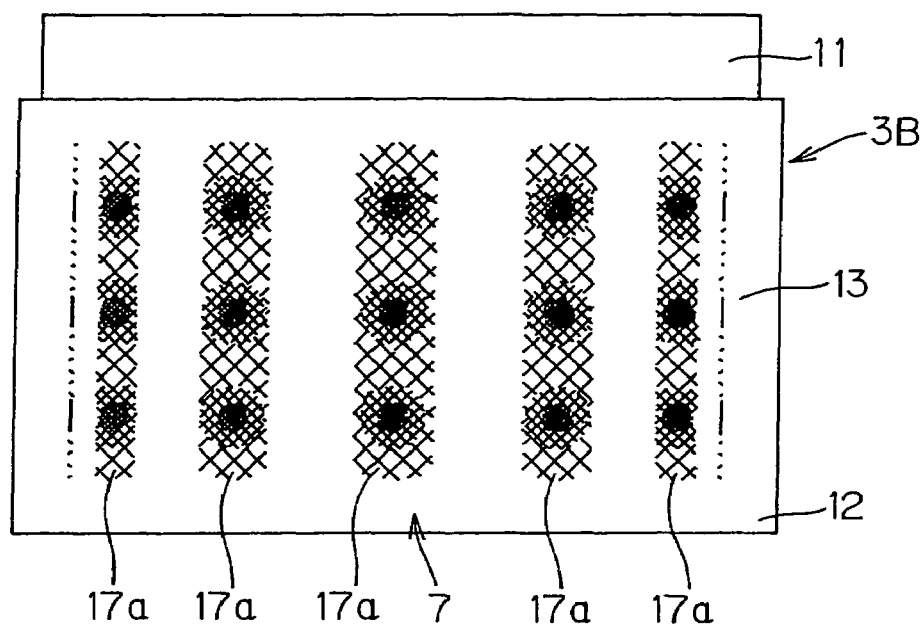
Figure 7B:
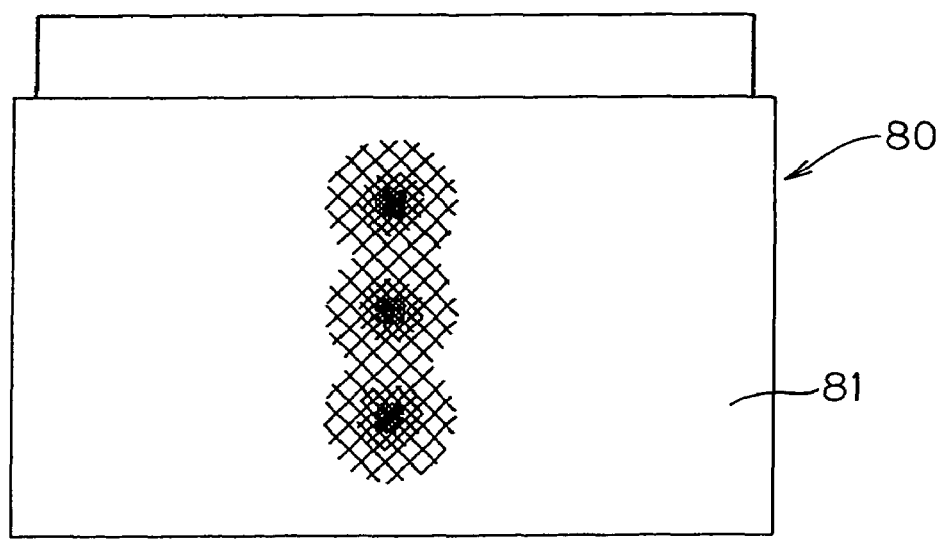
FIG. 7B is a schematic view of an indicator unit of a comparative example, illustrating the light emitting state thereof.

FIG. 7A is a schematic view of the indicator unit 3B under light emission according to the preferred embodiment, while FIG. 7B is a schematic view of an indicator unit 80 of a comparative example.

In the indicator unit 3B of the preferred embodiment, light from the light source 6 disposed at the light source position 15, is incident from the light incident portion 16 upon the inside of the lens component 7 and is guided in the emission directions by the plurality of plate-like light guiding portions 17. As to the circumferential direction T, light is emitted from the outer edge portions 17a of the plate-like light guiding portions 17. As to the axial direction, light is emitted from a plurality of axially arranged positions corresponding to the radial reflecting faces 29 at the outer edge portion 17a of each plate-like light guiding portion 17. As the result, as shown in FIG. 7A, light in a plurality of vertical stripes is seen as extended in a planar form at the outer periphery 13, thus enhancing the visibility.

On the other hand, in the indicator unit 80 of the comparative example in FIG. 7B, a lens component 81 has, instead of the plurality of plate-like light guiding portions 17, a light guiding portion (not shown) annular in plan view. This annular light guiding portion has a sectional shape taken along the axial direction, similar to that of each plate-like light guiding portion. In the comparative example, a plurality of light points are seen in the axial direction as done in the preferred embodiment, but only one light point is seen in the circumferential direction T. As the result, only one band-like light is seen as shown in FIG. 7B, and therefore the visibility is low as compared with the indicator unit 3B of the preferred embodiment shown in FIG. 7A in which light in a plurality of vertical stripes is seen.

As discussed in the foregoing, in the lens component 7 of the first preferred embodiment of the present invention, the plurality of plate-like light guiding portions 17 are disposed radically around the predetermined axis SO. Accordingly, light from the light source 6 disposed at the light source position 15 of the lens component 7, can be emitted radically through the light incident portion 16 and the plate-like light guiding portions 17. In the plate-like light guiding portions 17, at least a portion of the light is internally reflected by the radial reflecting faces 29 and the main surfaces 25 serving as the light guiding and reflecting surfaces, and is guided in the emission directions F while being collected between light guiding and reflecting surfaces, and is thus directed in multiple directions.

Accordingly, the lens component 7 can suitably be applied to the signal indicating light 1 for emitting light in the emission directions F. Further, the light signal can readily be recognized in the surrounding broad area, thus achieving a high visibility.

Further, both the pairs of main surfaces 25 serving as the light guiding and reflecting surfaces and the radial reflecting faces 29 required for enhancing the visibility of the signal indicating light 1, are made in a unitary structure with the plate-like light guiding portions 17 which are made in a single component. This results in reduction in the number of component elements. As the result, for example, the assembling cost of the signal indicating light 1 can be reduced. Further, the failure rate of the signal indicating light 1 is generally reduced in proportion to the reduction in the number of component elements. This contributes to improvement in the reliability of the signal indicating light 1.

Further, in the preferred embodiment, the plurality of plate-like light guiding portions 17 are made in a unitary structure. Moreover, light from the single light source 6 is guided in all directions in the surroundings. This minimizes the number of the light source 6. Further, the lens component 7 is made in a unitary structure with the globe of the signal indicating light 1. This results in further reduction in the number of component elements of the indicator unit 3B.

Further, the preferred embodiment includes the plurality of stairs-like radial reflecting faces 29. Accordingly, light from the light source 6 can be reflected as dispersed by the radial reflecting faces 29. For example, provision can be made such that light from the single light source 6 is emitted from a plurality of portions of the lens component 7, thus contributing to improvement in visibility.

Further, the outer edge portions 17a of the plate-like light guiding portions 17 are connected to one another by the joint portions 18. This advantageously reinforces the lens component 7 and makes it easy to handle the same.

Further, when resin-molding the plate-like light guiding portions 17, the presence of the joint portions 18 enables the resin to readily flow in the mold. This not only increases the degree of designing freedom for resin-molding the lens component 7, but also facilitates the production of the lens component 7, enabling the same to be produced at low costs.

When the plurality of radial reflecting faces 29 and the pairs of main surfaces 25 serving as the light guiding and reflecting surfaces, are total-reflection surfaces for totally reflecting the light, the light can efficiently be guided in the emission directions, thus contributing to improvement in visibility. Examples of the total-reflection surfaces include (i) reflection surfaces inclined such that the light incident angle is greater than the critical angle of the total reflection as mentioned earlier, and (ii) reflection surfaces having reflection members of, for example, aluminum deposited films and the like for reflecting all incident light, as will be discussed later. The former example is preferable in view of simplified structure. When provision is made such that only a portion of the radial reflecting faces 29 or only a portion of the main surfaces 25, totally reflects the light, a portion of the effect produced by the total reflection above-mentioned can be obtained. In brief, to obtain the effect produced by total reflection, it is sufficient to make provision such that at least a portion of at least either the radial reflecting faces 29 or the light guiding and reflecting surfaces, totally reflects the light.

In the signal indicating light 1 and the indicator units 3A, 3B, 3C according to the preferred embodiment, the operational effect of the lens component 7 above-mentioned can be obtained, thus achieving both the improvement in visibility and the reduction in production cost.

The basic external shape of each of the indicator units 3A, 3B, 3C of the preferred embodiment is a column shape. Accordingly, a column-shape signal indicating light 1 can readily be formed.

In each of the indicator units 3A, 3B, 3C of the preferred embodiment, the light source 6, the lens component 7, the circuit substrate 8 and the like included as component elements in each of the indicator units 3A, 3B, 3C, are so mechanically connected to one another as to be integrally handled. Accordingly, when assembling a signal indicating light 1, the indicator units 3A, 3B, 3C can readily be incorporated in the signal indicating light 1.

In the lens component 7, light from the light source 6 passes through its boundary faces only at the concave portion 14 serving as the light incident face and at the outer periphery 13 serving as the light emitting face. That is, the number of boundary-face passing times is restrained to 2. This preferably restrains light attenuation and enhances the visibility.

Further, when the outer periphery 13 of the lens component 7 is made by a smooth curved cylindrical surface, the outer periphery 13 is advantageously hardly contaminated.

In a conventional indicator unit, in order to direct the light in multiple directions, it is required to form an undulated diffusing lens on the outer periphery of the globe. This restrains the degree of freedom for the shape of the outer periphery. On the other hand, in the lens component 7 of the preferred embodiment, the radial reflecting faces 29 and the main surfaces 25 can direct the light in multiple directions.

Thus, the shape of the outer periphery 13 can freely be designed, thus increasing the degree of freedom for outer periphery designing.

The following will discuss a lens component 7A of a second preferred embodiment. In the following, the description will be chiefly made of points different from the preferred embodiment above-mentioned. Like parts in the second preferred embodiment are designated by like reference numerals used in the first preferred embodiment, and the description thereof will be omitted. This also applies to other preferred embodiments and modifications to be discussed later.

Figure 8:
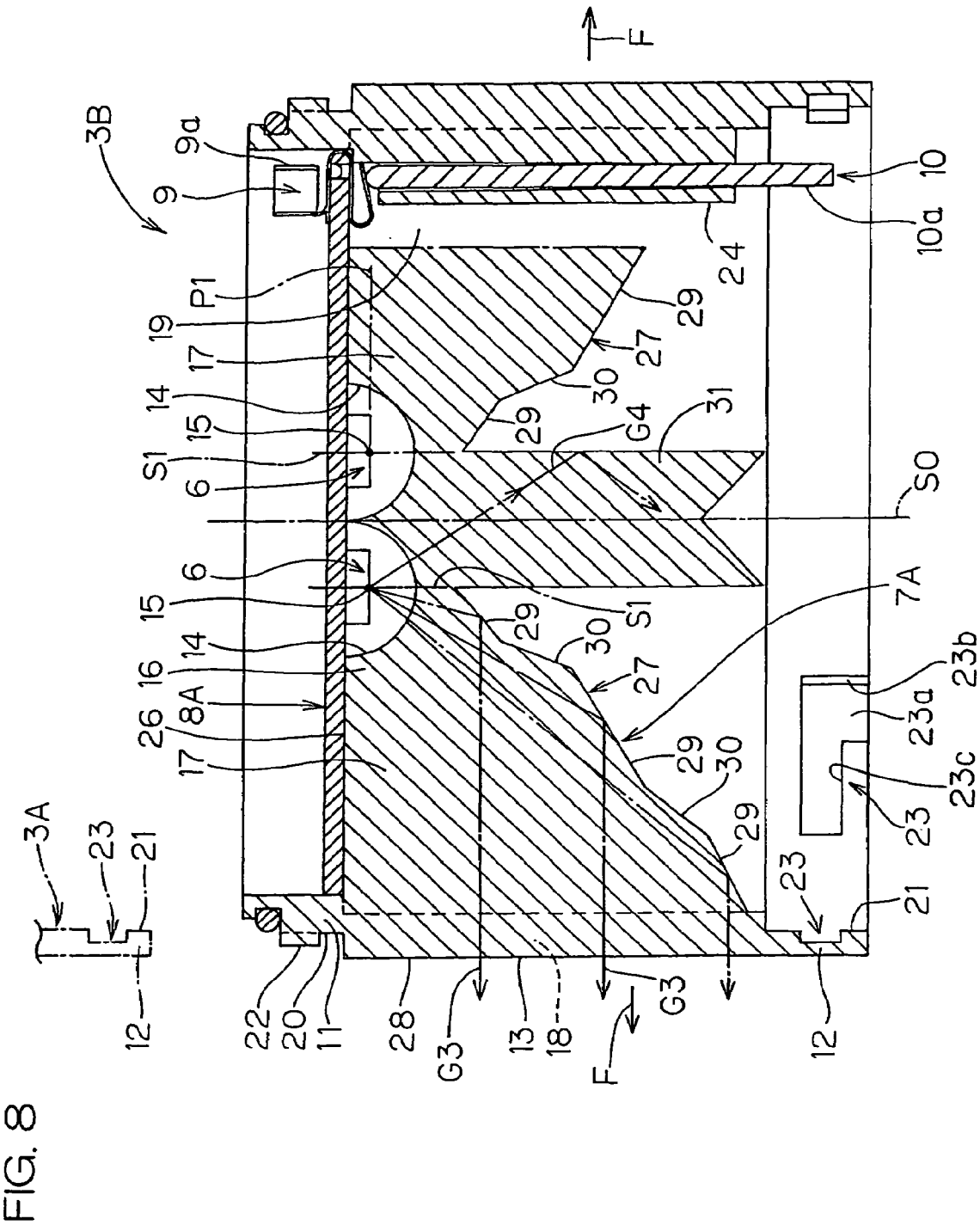
FIG. 8 is a section view, taken along the line VIII-VIII in FIG. 9, of an indicator unit of a signal indicating light according to a second preferred embodiment of the present invention.
Figure 9:
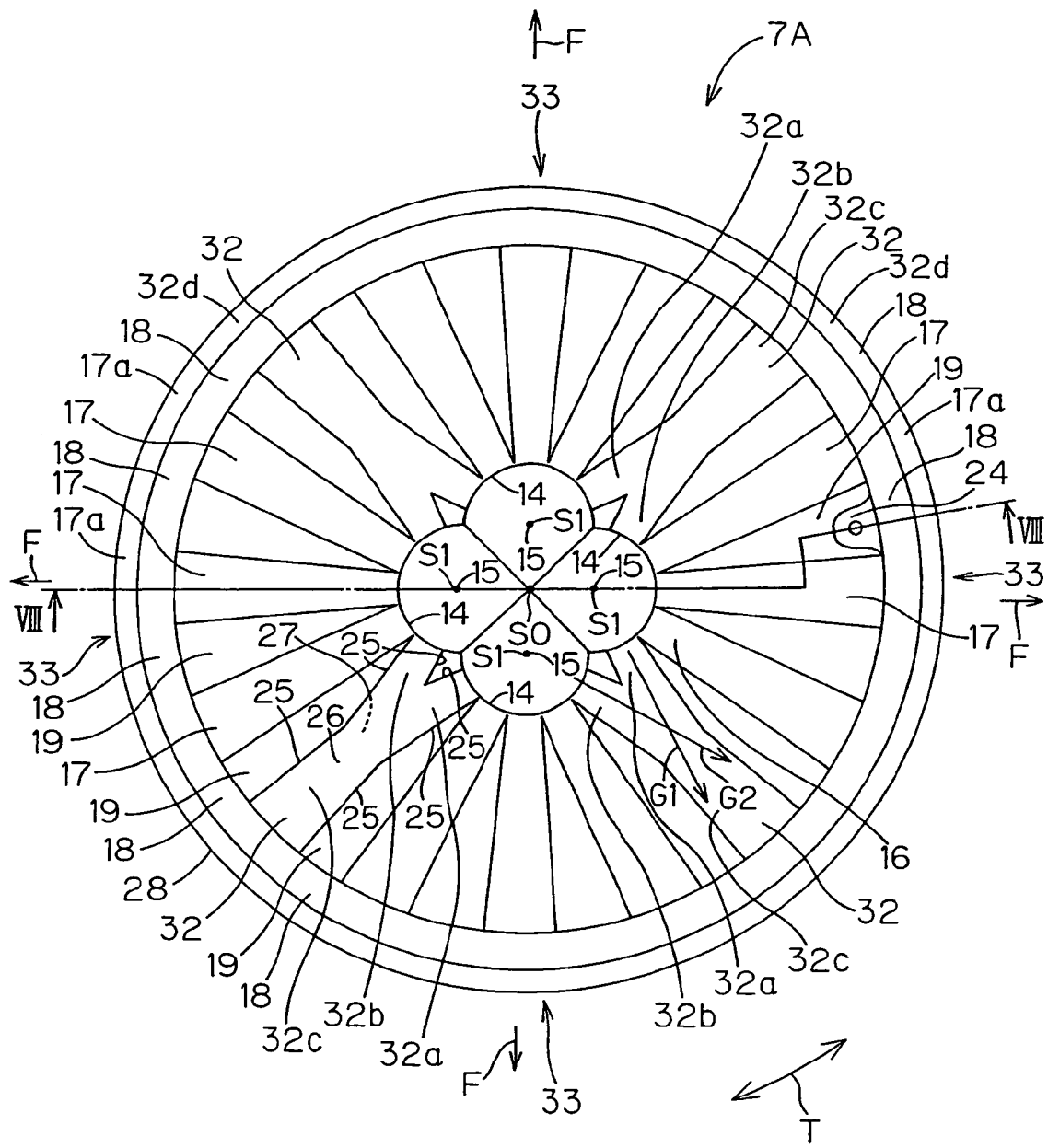
FIG. 9 is a plan view of the lens component shown in FIG. 8.

FIG. 8 is a section view of an indicator unit 3B according to a second preferred embodiment of the present invention, while FIG. 9 is a plan view of the lens component 7A shown in FIG. 8. FIG. 8 shows a section taken along the line VIII-VIII in FIG. 9.

The indicator unit 3B according to the second preferred embodiment has a lens component 7A instead of the lens component 7, a plurality of, for example four, light sources 6, and a single circuit substrate 8A. The circuit substrate 8A supports the four light sources 6.

The lens component 7A is provided in an upper end portion 11 thereof with a plurality of concave portions 14. The concave portions 14 are disposed respectively for the light sources 6, and made in the form of partial spheres. The insides of the concave portions 14 communicate with one another. Light source positions 15 are set at the respective centers of the partial spheres of the concave portions 14. The light source positions 15 surround the predetermined center position on the axis SO. The light source positions 15 are located, on a plane P1 at right angles to the axis SO, in the vicinity of circumferentially equally distributed positions radically separated by an equal distance from the center position above-mentioned. The plane P1 is parallel to first end faces 26 of plate-like light guiding portions 17.

A light incident portion 16 is formed by a peripheral edge portion of the plurality of concave portions 14.

Further, the lens component 7A has a cylindrical post-like portion 31 extending along the axis SO from the light incident portion 16. The post-like portion 31 has a single cylindrical face forming the outer periphery, and a circular cone which is axially upwardly concaved from the lower end. When viewed in the axial direction, the upper end edge of the cylindrical face of the post-like portion 31, is disposed as overlapping the plurality of light source positions 15.

The lens component 7A has a plurality of forked light guiding portions 32.

Each forked light guiding portion 32 is arranged to join lights coming in two directions from two light sources 6, and to guide the joined light into one direction in the emission directions F. Each forked light guiding portion 32 has a two-branch shape in plan view. Each forked light guiding portion 32 has (i) a pair of plate-like first portions 32a, 32b which are radically inwardly disposed, and (ii) a plate-like second portion 32c which is disposed radically outwardly with respect to the first portions 32a, 32b and which is connected thereto. The pair of first portions 32a, 32b and the second portion 32c are made in a unitary structure.

It can be said that each forked light guiding portion 32 is made in a unitary structure by (i) a first plate-like light guiding portion (not shown) formed by one first portion 32a and the second portion 32c, and (ii) a second plate-like light guiding portion (not shown) formed by the other first portion 32a and the second portion 32c. Likewise each plate-like light guiding portion 17, each of the first and second plate-like light guiding portions forming a forked light guiding portion 32, has a pair of main surfaces 25, a first end face 26, a second end face 27 and a third end face 28.

More specifically, the description is now made of the forked light guiding portion 32 shown at the lower right part in FIG. 9. This forked light guiding portion 32 is disposed as corresponding to two light source positions 15 respectively shown at the right and lower sides, out of the four light source positions 15, in FIG. 9. One first portion 32a extends in a direction at right angles to one axis S1 passing through one light source position 15 (shown at the right side in FIG. 9). The other first portion 32b extends in a direction at right angles to the other axis S1 passing through the other light source position 15 (shown at the lower side in FIG. 9). The second portion 32c extends in a direction at right angles to the axis SO passing through the center position of the outer shape of the lens component 7A.

The one first portion 32a of the forked light guiding portion 32 guides radically outwardly light G1 from one light source 6 disposed at the one light source position 15 (shown at the right side in FIG. 9). The other first portion 32b guides radically outwardly light G2 from the other light source 6 disposed at the other light source position 15 (shown at the lower side in FIG. 9). The second portion 32c guides further radically outwardly the light G1 from the one light source 6 guided by the one first portion 32a, and guides further radically outwardly the light G2 from the other light source 6 guided by the other first portion 32b, and then emits the lights G1, G2 from the outer periphery 13.

The lens component 7A includes a plurality of, for example four, light guiding member groups 33. Each light guiding member group 33 has a plurality of, for example three, plate-like light guiding portions 17 and a plurality of, for example two, forked light guiding portions 32, these three plate-like light guiding portions 17 and two forked light guiding portions 32 forming one light guiding member group 33 for the light source position 15. More specifically, radically disposed around the axis S1 of each light source position 15 are a plurality of plate-like light guiding portions 17, one first portion 32a of one forked light guiding portion 32, and the other first portion 32b of the other forked light guiding portion 32, which form each light guiding member group 33 for each light source positions 15. Each light guiding member group 33 is arranged to emit light in a partial directional range out of all directions around the axis SO, more specifically, in the directional range obtained by equally dividing all directions by the number of the light sources 6. Each forked light guiding portion 32 is shared with adjacent two light guiding member groups 33.

In each light guiding member group 33, the axis S1 serving as the center of the radial layout is disposed. A plurality of axes S1 are disposed in the lens component 7A in its entirety. Each axis S1 is different from the axis SO serving as the center axis of the basic external shape of the lens component 7A.

A plurality of joint portions 18 include (i) joint portions 18 each of which connects the outer edge portions 17a of adjacent two plate-like light guiding portions 17 to each other, and (ii) joint portions 18 each of which connects the outer edge portion 17a of a plate-like light guiding portion 17 to the outer edge portion 32 d of the second portion 32c of the forked light guiding portion 32 which is adjacent to the plate-like light guiding portion 17 above-mentioned.

As shown in FIG. 8, in the lens component 7A, when a light portion G3 from the light source 6 (for example shown at the left side in FIG. 8) disposed for a predetermined light source position 15, is incident upon that portion of the concave portion 14 far away from the axis SO, the light portion G3 is guided radically outwardly by the corresponding light guiding member group 33. Further, a light portion of light from the light source 6 (for example shown at the right side in FIG. 8) disposed at other light source position 15 than the predetermined light source position 15 above-mentioned, is also incident from the concave portion 14 corresponding to the predetermined light source position 15 above-mentioned. According to this preferred embodiment, a light portion G4 from the light source 6 at the predetermined light source position 15 above-mentioned, is incident upon that portion of the concave portion 14 near to the axis SO and is then guided to the post-like portion 31. The light portion thus guided passes through the post-like portion 31 directly or after internal reflection. Then, the light portion G4 is emitted in emission directions from the post-like portion 31. Light from the post-like portion 31 makes bright the center portion of the lens component 7A in a wide range, thus further contributing to improvement in visibility.

According to the second preferred embodiment, a large light amount obtainable with the use of a plurality of light sources 6, can enhance the visibility of a light signal of the indicator unit 3B. Further, the plurality of light sources 6 can be disposed, in the vicinity of one another, or the single plane P1. This facilitates the assembling of the indicator unit 3B.

There is available a remarkably cheap light source of which light amount is even small. By utilizing a plurality of such light sources, it is possible to achieve an economical indicator unit and an economical signal indicating light, yet assuring a practical light amount.

Figure 10:
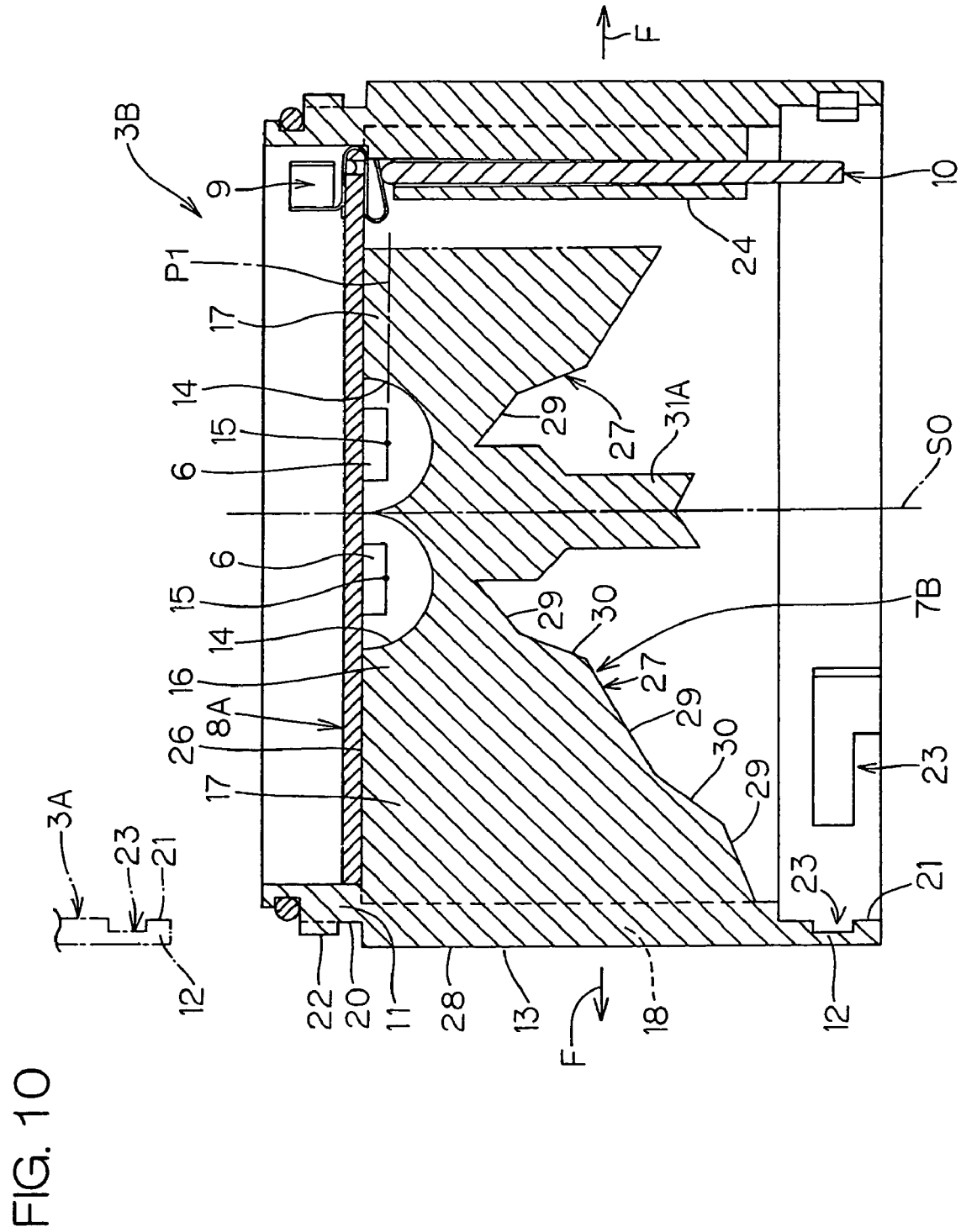
FIG. 10 is a section view of an indicator unit including a lens component according to a third preferred embodiment of the present invention.

FIG. 10 is a section view of an indicator unit 3B including a lens component 7B according to a third preferred embodiment. As shown in FIG. 10, the lens component 7B has a post-like portion 31A instead of the post-like portion 31 of the lens component 7A (See FIG. 8). The post-like portion 31A has a stepped slender tip. The post-like portion 31A includes a plurality of axially separated cylindrical surfaces having different diameters, and at least one circular conical surface connecting these cylindrical surfaces to each other. The stepped post-like portion 31A transmits light more easily than the post-like portion 31 having no step.

Figure 11:
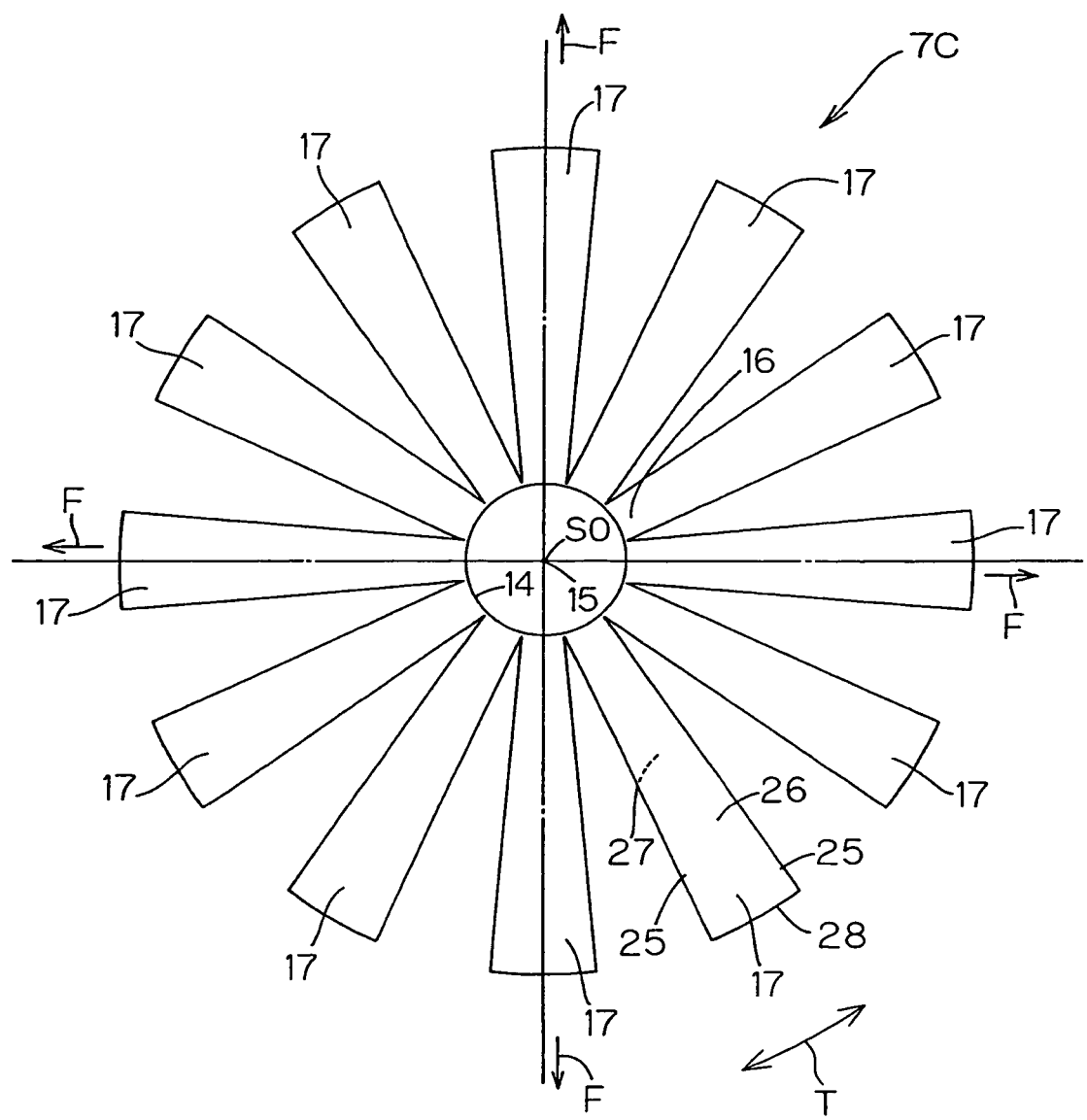
FIG. 11 is a plan view of a lens component according to a fourth preferred embodiment of the present invention.

FIG. 11 is a plan view of a lens component 7C according to a fourth preferred embodiment. The lens component 7C in FIG. 11 does not have the joint portions 18 in the lens component 7 of the first preferred embodiment (See FIG. 2). It is noted that FIG. 11 shows only the main portion of the lens component 7C. Likewise in the lens component 7, the basic external shape of the lens component 7C is a column shape having the axis SO as the center axis.

Figure 12:
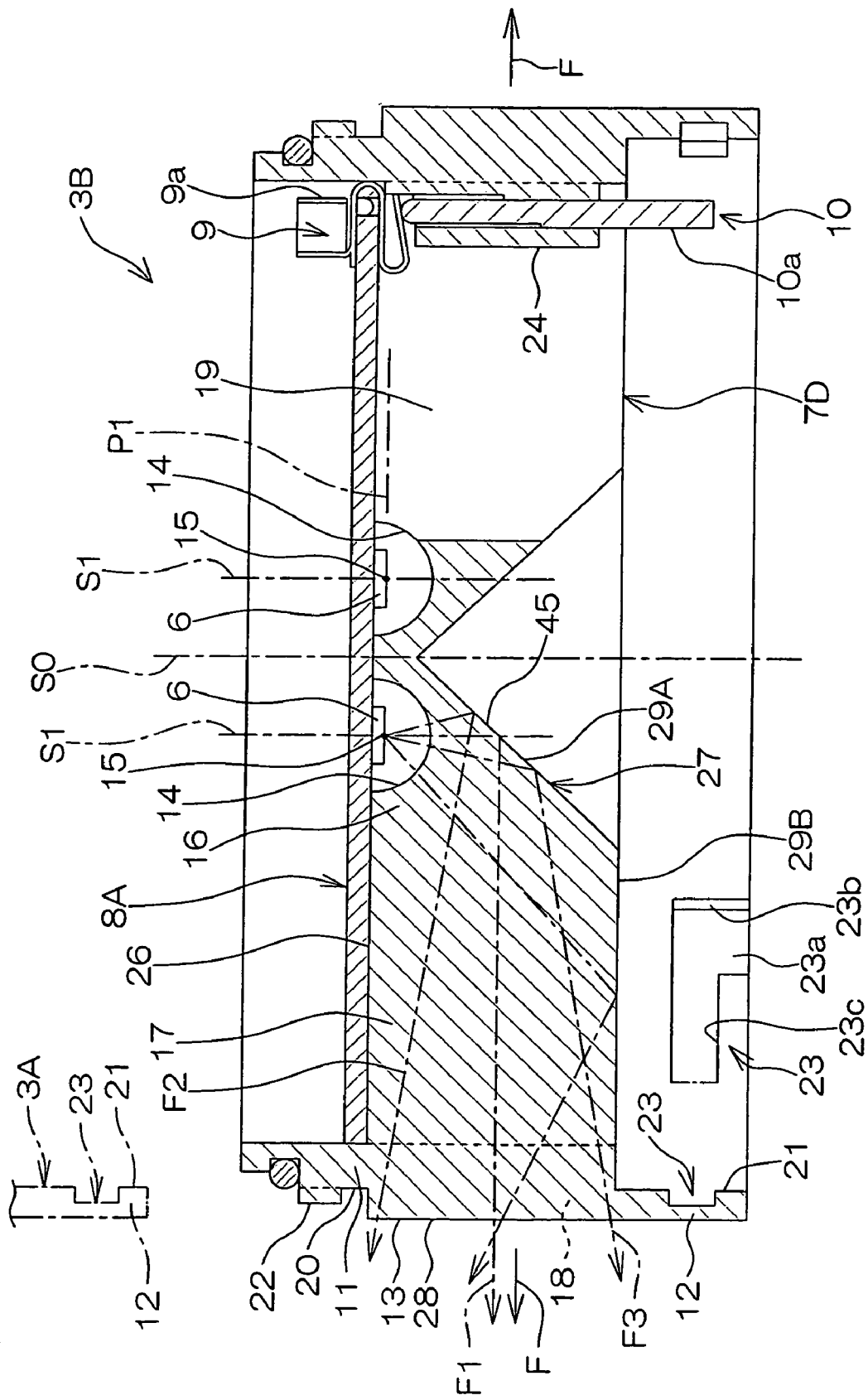
FIG. 12 is a section view, taken along the line XII-XII in FIG. 13, of an indicator unit including a lens component according to a fifth preferred embodiment of the present invention.
Figure 13:
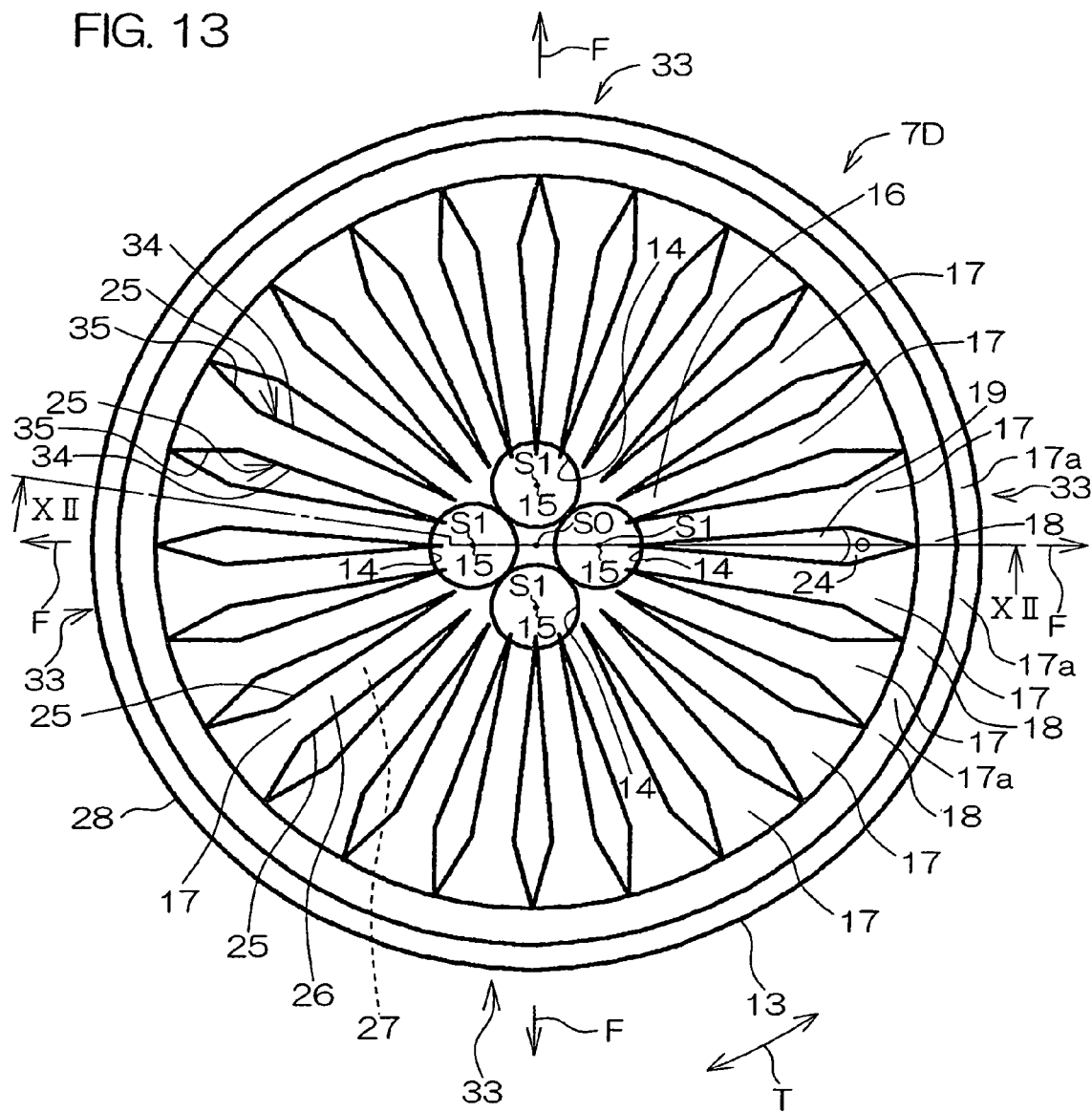
FIG. 13 is a plan view of the lens component shown in FIG. 12.
Figure 14:
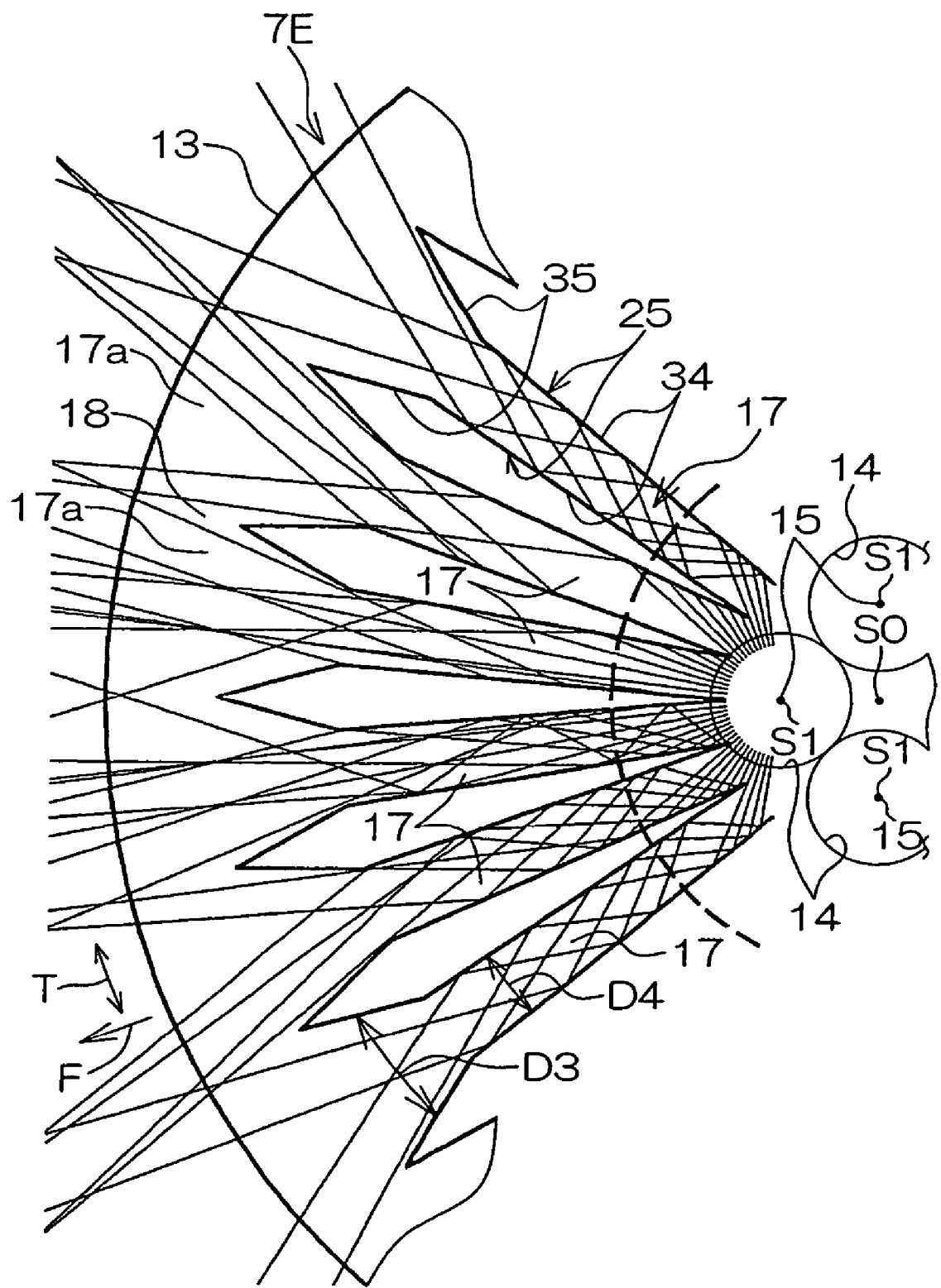
FIG. 14 is an enlarged view illustrating a light diffusion at a main portion of the lens component in FIG. 13, a plurality of light rays directed in different directions at predetermined angles from the light source being shown with fine lines.

FIG. 12 is a section view of an indicator unit 3B including a lens component 7D according to a fifth preferred embodiment. FIG. 13 is a plan view of the lens component 7D shown in FIG. 12. FIG. 14 is an enlarged view illustrating a light diffusion at the main portion of the lens component 7D in FIG. 13. FIG. 12 shows a section taken along the line XII-XII in FIG. 13.

As shown in FIGS. 12 and 13, the indicator unit 3B of the fifth preferred embodiment has a single lens component 7D, a plurality of light sources 6 and a single circuit substrate 8A. Four light sources 6 are disposed.

The lens component 7D is different from the lens component 7 in the following points. That is, the lens component 7D is provided in the upper end portion 11 thereof with a plurality of, for example four, concave portions 14. Each concave portion 14 is a partial sphere, more specifically, a semisphere. The concave portions 14 are disposed in the vicinity of one another. The insides of the concave portions 14 do not communicate with one another. A plurality of light source positions 15 are respectively set at the center positions of the semi-spherical concave portions 14. Likewise in the second preferred embodiment, the plurality of light source positions 15 are located on a common plane P1 at positions circumferentially equally distributed around the axis SO. A light incident portion 16 of the lens component 7D is formed by the peripheral edge portions of the concave portions 14.

In the lens component 7D, each plate-like light guiding portion 17 has a second end face 27 having (i) a single first radial reflecting face 29A which is radically inwardly disposed, and (ii) a single second radial reflecting face 29B which is disposed radically outwardly with respect to the first radial reflecting face 29A. It is noted that the connecting faces 30 (See FIG. 2 for example) are omitted. The first and second radial reflecting faces 29A, 29B are different, in the following point, from the radial reflecting faces 29 of the lens component 7 of the first preferred embodiment. That is, the first and second radial reflecting faces 29A, 29B are directly connected to each other and therefore continuous.

The first radial reflecting face 29A is inclined radically outwardly with respect to the axis SO and extends from a position which is near to the upper end portion 11 and which is located on or in the vicinity of the axis SO. In the radial direction, the first radial reflecting face 29A reaches the intermediate position between the outer periphery 13 and the axis SO. The axial center portion 45 of the first radial reflecting face 29A, is positioned immediately below or approximately below the light source positions 15. More specifically, the center portions 45 of the first radial reflecting faces 29A of the plurality of plate-like light guiding portions 17, are disposed as overlapping, in plan view, a circle having the center on the axis SO and passing through the light source positions 15.

The first radial reflecting face 29A is disposed as inclined crossing the axis S1 at the center portion 45, and receives light from the light source 6 disposed at the light source position 15 on the axis S1. Out of the light thus received, a light portion along the axis S1 is radically outwardly reflected in directions at right angle to the axis SO. More specifically, the light portion having the highest intensity out of the light from the light source 6, is reflected at the center portion 45 in directions at right angle to the axis SO, and a light portion having intensity higher than a half of the highest intensity, is reflected at the center portion 45 substantially in directions at right angle to the axis SO.

The second radial reflecting face 29B, disposed near to the lower end portion 12, is an annular flat face and extends in directions at right angle to the axis SO. The second radial reflecting face 29B is continuously and directly connected to the radically outward edge of the first radial reflecting face 29A, and extends from the edge radically outwardly up to the vicinity of the outer periphery 13. The second radial reflecting face 29B is so disposed as not to overlap the light source positions 15 in plan view.

The second radial reflecting face 29B receives a weak light portion, out of light from the light source 6, having intensity of or lower than a half of the highest intensity. The second radial reflecting face 29B receives direct light from the light source 6 and light reflected by the main surfaces 25, and then reflects the light thus received and reflected.

The first radial reflecting face 29A may be extended to the vicinity of the outer periphery 13 with the second radial reflecting face 29B substantially omitted. Further, at least portions of at least either the first radial reflecting faces 29A or the second radial reflecting faces 29B, may be arranged such that their sectional shape taken along the axial direction forms a parabola.

As shown in FIG. 13, the lens component 7D has a plurality of plate-like light guiding portions 17 disposed radically around the axis SO, and four light source positions 15 set in the vicinity of the radial center of these plate-like light guiding portions 17. Six plate-like light guiding portions 17 for each light source position 15 are disposed mainly for guiding the light from the light source 6 for each light source position 15. These six plate-like light guiding portions 17 are disposed adjacently in the circumferential direction and extend radically from the corresponding light source position 15 to form a fan shape having 90 degree around the axis SO in plan view. The corresponding light source position 15 is set at the fan shape base portion near to the axis SO. These six plate-like light guiding portions 17 form a light guiding member group 33 per corresponding light source position 15. In the lens component 7D in its entirety, four light guiding member groups 33 are formed as corresponding to the four light source positions 15.

Referring to FIG. 14, each main surface 25 of each plate-like light guiding portion 17 of the lens component 7D, extends as bent in radial directions in plan view. Each main surface 25 includes a first portion 34 formed radically inwardly with respect to the bent part, and a second portion 35 disposed radically outwardly with respect to the first portion 34. Each of the first and second portions 34, 35 is formed by a flat face.

In each plate-like light guiding portion 17, the first portions 34 of a pair of main surfaces 25 are opposite to each other in the circumferential direction, and the second portions 35 are opposite to each other in the circumferential direction. The distance between a pair of first portions 34 is wider in the radial outward direction. The distance between a pair of second portions 35 is wider in the radial outward direction, and is wider than the distance between the first portions,34. An angle D3 formed by a pair of second portions 35 is greater than an angle D4 formed by a pair of first portions 34.

In adjacent two plate-like light guiding portions 17, the second portions 35 of the opposite main surfaces 25 extend, at the outer edge portions 17a thereof, in crossing directions and are directly connected to each other to form a joint portion 18. Accordingly, the light path in each plate-like light guiding portion 17 is gradually wider at the radial inward part just proximal to the joint portion 18, enabling light from the light source 6 to be readily guided to the joint portion 18.

In the lens component 7D, light emitted, to a side away from the axis SO, from a light source 6 disposed at the corresponding light source position 15, is incident upon the plurality of plate-like light guiding portion 17 of the light guiding member group 33 corresponding to the light source position 15, and is then guided in the emission directions F as follows.

Out of the six plate-like light guiding portions 17 forming one light guiding member group 33, two plate-like light guiding portions 17, for example the third and fourth plate-like light guiding portions 17 from above out of the six plate-like light guiding portions 17 vertically arranged in FIG. 14, reflect, directly or by the radial reflecting faces 29A, light portions from the light source 6 disposed at the corresponding light source position 15, and irradiate these light portions in the emission directions without reflection by the main surfaces 25. The remaining four plate-like light guiding portions 17 reflect light from the light source 6 by the main surfaces 25, and irradiate the light in the emission directions. In the former two plate-like light guiding portions 17, the angles formed by the main surfaces 25 and the rays of light from the light source 6, are smaller than those in the remaining four plate-like light guiding portions 17.

Figure 15:
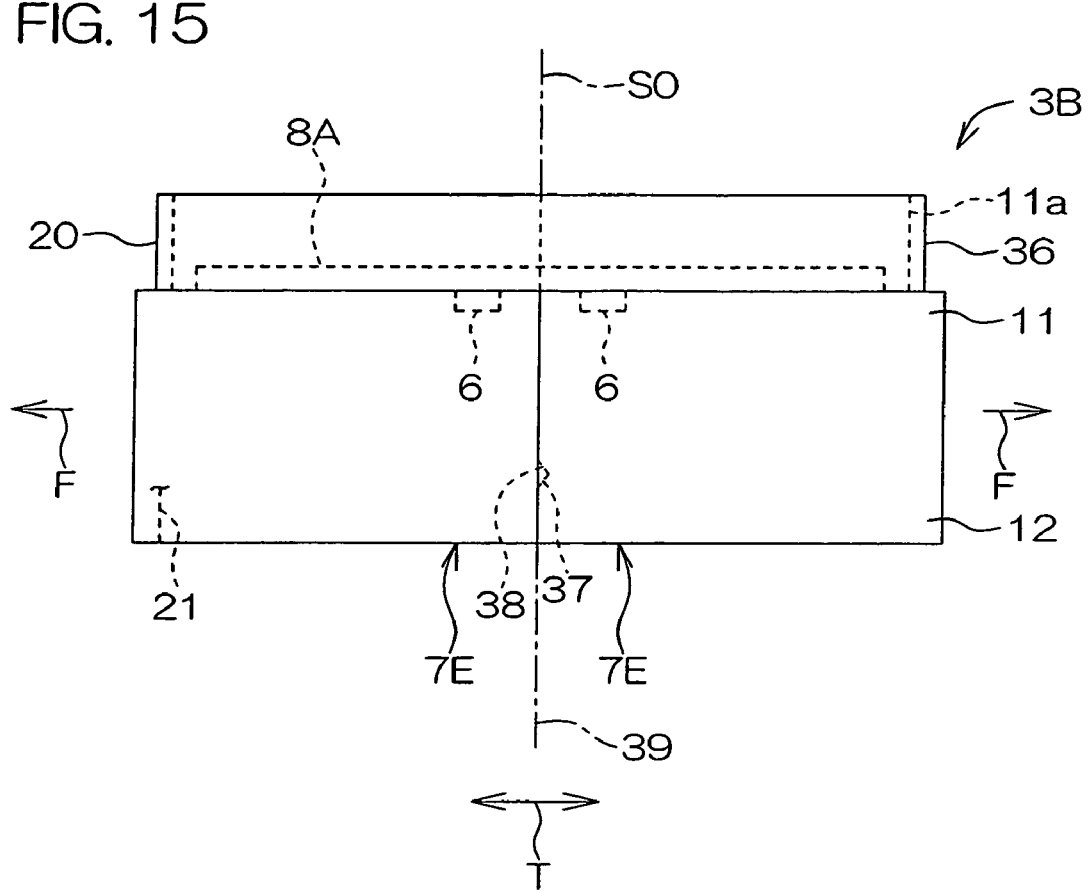
FIG. 15 is a front view of an indicator unit including a lens component according to a sixth preferred embodiment of the present invention.
Figure 16:
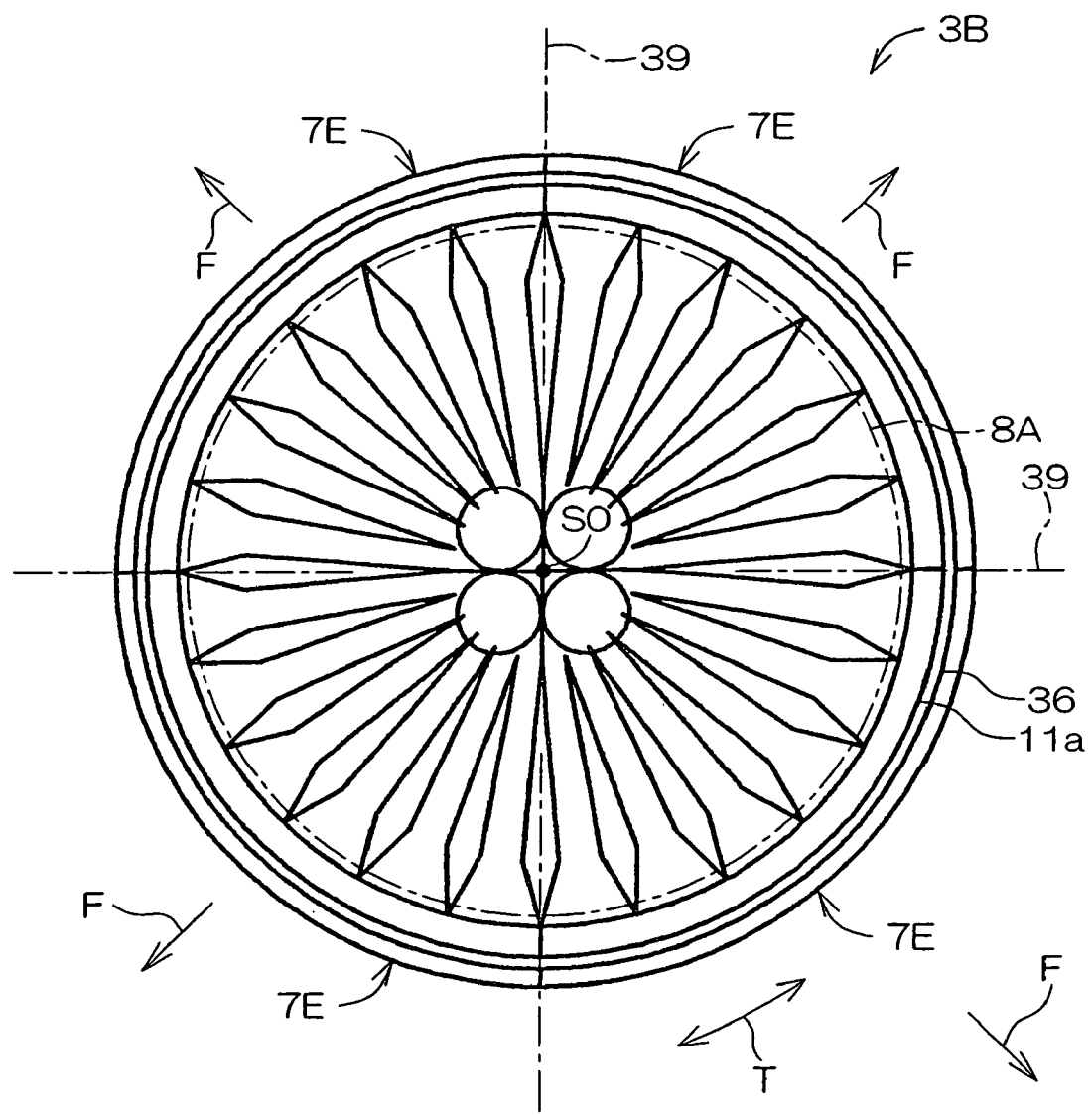
FIG. 16 is a plan view of the indicator unit in FIG. 15, with no circuit substrate and the like attached.

FIG. 15 is a front view of an indicator unit 3B including a lens component 7E according to a sixth preferred embodiment. FIG. 16 is a plan view of the indicator unit 3B in FIG. 15, with no circuit substrate and the like attached.

The indicator unit 3B according to the sixth preferred embodiment has a plurality of lens components 7E, a plurality of light sources 6 and a single circuit substrate 8A. More specifically, four lens components 7E and four light sources 6 are disposed. One light source 6 is disposed for each lens component 7E. The lens components 7E are joined together in the circumferential direction T and are made in an annular form in their entirety. The indicator unit 3B has at least one annular member 36, coupling portions 37, coupling portions 38, which serve as coupling means for joining the lens components 7E together in the circumferential direction T. Adhesives (not shown) may be used as the coupling means.

Figure 17:
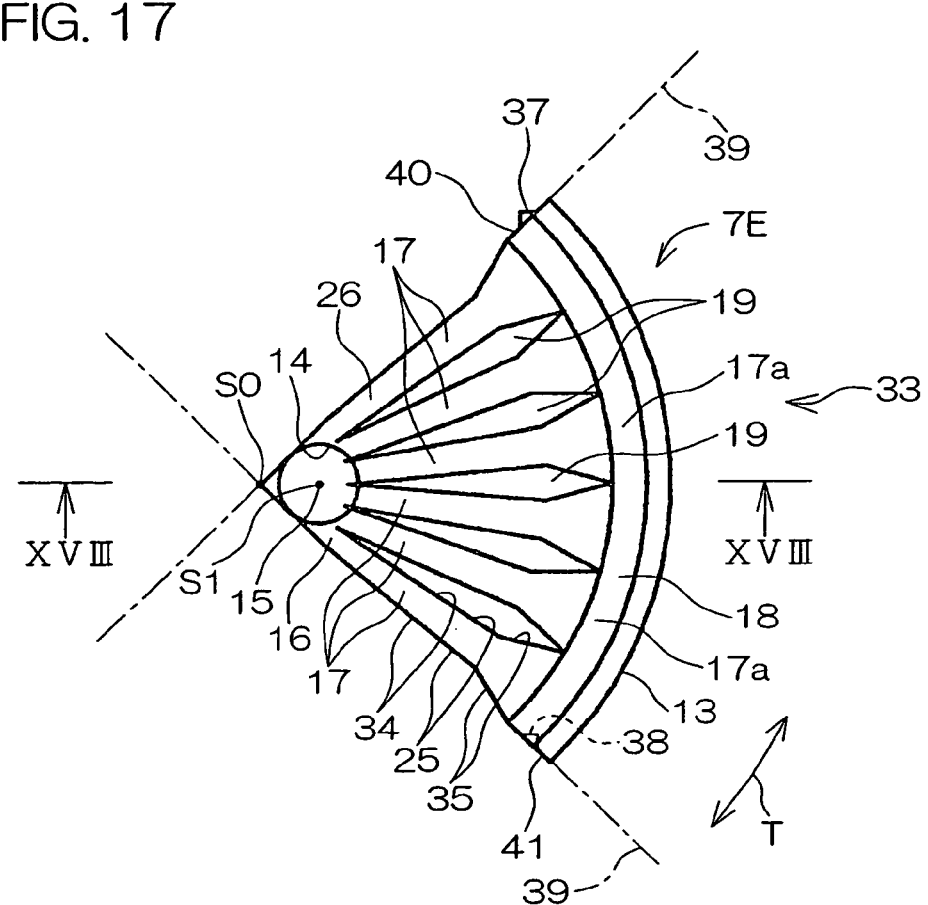
FIG. 17 is a plan view of the lens component in FIG. 15.
Figure 18:
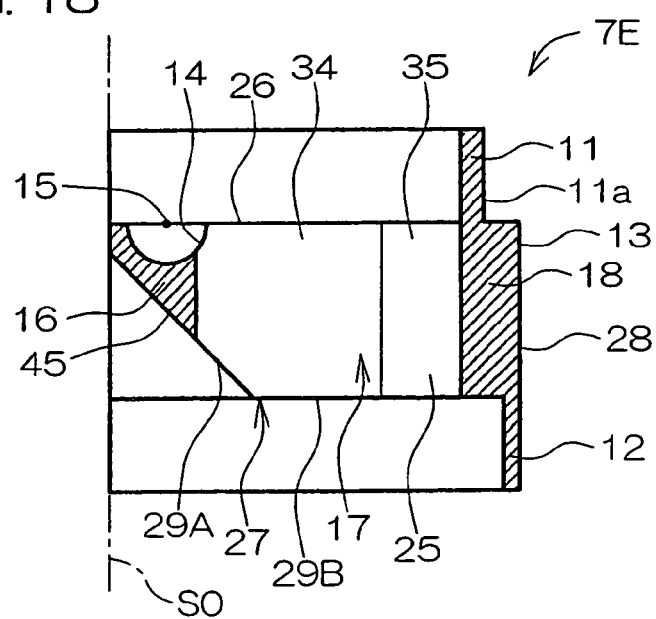
FIG. 18 is a section view, taken along the line XVIII-XVIII in FIG. 17, of the lens component in FIG. 17.

FIG. 17 is a plan view of a lens component 7E. FIG. 18 is a section view, taken along the line XVIII-XVIII in FIG. 17, of the lens component 7E in FIG. 17.

Each lens component 7E has an external shape equivalent to one divided body obtained by equally dividing the lens component 7D (See FIGS. 12 and 13) into four portions in the circumferential direction T. Each lens component 7E has a basic external shape equivalent to a divided body, i.e., a post-like body having a ¼-circle section in plan view. More specifically, the basic external shape of the lens component 7D is a column shape as shown in FIG. 13, and the axis of this column shape is accorded with the predetermined axis SO. When such a column-shape body is equally divided in the circumferential direction T by two dividing faces 39, four divided bodies are formed. Each dividing face 39 is a plane face including the axis SO. These dividing faces 39 cross each other at right angles, and the crossing line is accorded with the axis SO. Four divided bodies are equal to one another, and each divided body is a post-like member having a ¼-circle section in plan view.

Referring to FIGS. 17 and 18, each lens component 7E has a single concave portion 14, and a single light source position 15 is set in the concave portion 14. Each light source position 15 is located inside of the contour of each lens component 7E.

Each lens component 7E has a light incident portion 16 formed by the peripheral edge of the concave portion 14, and a plurality of, for example six, plate-like light guiding portions 17. These plate-like light guiding portions 17 form a single light guiding member group 33 corresponding to each light source position 15.

Each lens component 7E has first and second end faces 40, 41. The first end face 40 is included in one dividing face 39, and the second end face 41 is included in the other dividing face 39. Each of the first and second end faces 40, 41 is flat, and axially and radically extends. The imaginary extension lines of the first and second end faces 40, 41 cross each other at right angles in plan view. The first and second end faces 40, 41 are formed at the outer edge portions 17a of the plate-like light guiding portions 17 at both ends in the circumferential direction T. The first and second end faces 40, 41 serve as coupling faces for joining the lens components 7E together in the circumferential direction T.

As shown in FIGS. 15 and 16, the annular member 36 is made in an endless ring shape. When the annular member 36 surrounds the lens components 7E, the annular member 36 joins the lens components 7E together in the circumferential direction T while preventing the lens components 7E from moving radically outwardly and axially. The annular member 36 may be made of a resilient material to resiliently fasten the lens components 7E radically inwardly from the circumferences of the lens components 7E. In this case, by resiliently expanding the annular member 36, the annular member 36 can readily be attached to the lens components 7E. Further, the relative movement of the annular member 36 and the lens components 7E can be prevented, thus enabling the lens components 7E to be securely joined together. The annular member 36 may be an arcuate member having ends such that the lens components 7E can be surrounded from the circumferences thereof.

As shown in FIGS. 15 and 17, each coupling portion 37 is a tapering pyramidal or conical projection serving as an engagement undulating portion formed on the first end face 40. Each coupling portion 38 is a concave serving as an engagement undulating portion formed in the second end face 41. These projections and concaves are engage able with each other and are disposed as opposite to each other when joining the lens components 7E together.

When joining adjacent two lens components 7E together in the circumferential direction T, the first end face 40 of one lens component 7E is opposite to and comes in contact with the second end face 41 of the other lens component 7E. At this time, the coupling portion 37 formed by a projection of one lens component 7E is fitted in the coupling portion 38 formed by a concave of the other lens component 7E. Thus, the adjacent two lens components 7E are, as radically and axially positioned, joined together in the circumferential direction T.

According to the sixth preferred embodiment, four lens components 7E as divided bodies are joined together in the circumferential direction T to form an assembled body. More specifically, the end faces 40, 41 of the four lens components 7E come in contact with each other such that the axes SO of the four lens components 7E coincide with one another. Thus, the four lens components 7E are, as radically and axially positioned, joined together in the circumferential direction T to form an assembled body. The assembled body has a shape identical with that of the lens component 7D, and therefore functions as in the case of the lens component 7D. The assembled body is then assembled with the light sources 6, the circuit substrate 8A and the like to form the indicator unit 3B. A plurality of indicator units 3B are axially joined together to form a signal indicating light 1.

According to the sixth preferred embodiment, the indicator units 3A, 3B are axially joined together through the annular member 36. More specifically, the upper end portions 11 of the four lens components 7E joined together, form a cylindrical outer peripheral face 11a, to which the inner periphery of the annular member 36 is fitted. The outer periphery of the annular member 36 includes the fitting surface 20 mentioned earlier. Provision is made such that when connecting, in stack; the indicator units 3A, 3B to each other, the outer periphery of the annular member 36 is fitted to the fitting surface 21 of the lower end portion 12 of the indicator unit 3A.

As discussed in the foregoing, the indicator unit 3B of the sixth preferred embodiment is arranged such that a plurality of lens components 7E as divided bodies are joined together in the circumferential direction T. It is therefore possible to form a large indicator unit 3B with the use of a plurality of small lens components 7E.

Further, each of the lens components 7E is made small as compared with the indicator unit 3B. Therefore, there can be utilized an economical small-size manufacturing facility such as molds and the like for manufacturing the lens components 7E. This results in reduction in the production cost of lens components 7E, and therefore in the production cost of the indicator unit 3B and the signal indicating light 1.

To form the indicator unit 3B, there is used at least one coupling means for joining the lens components 7E together. Accordingly, when assembling the signal indicating light 1, a plurality of lens components 7E of the indicator unit 3B are restrained from being unexpectedly separated from one another. This makes it easier to handle the indicator unit 3B. When the separation preventing means such as the annular member 36, adhesives and the like is used as coupling means, the component elements can securely be prevented from being separated from one another. When the positioning means such as coupling portions 37, 38 is disposed, the component elements can readily be positioned in assembling, thus facilitating the assembling.

According to the sixth preferred embodiment, the basic external shape of each lens component 7E is a divided body as obtained by equally dividing a post-like body in the circumferential direction T, and therefore the divided bodies have the same shape. Accordingly, a plurality of lens components 7E having the same shape can be used as a plurality of lens components of the indicator unit 3B.

Figure 19:
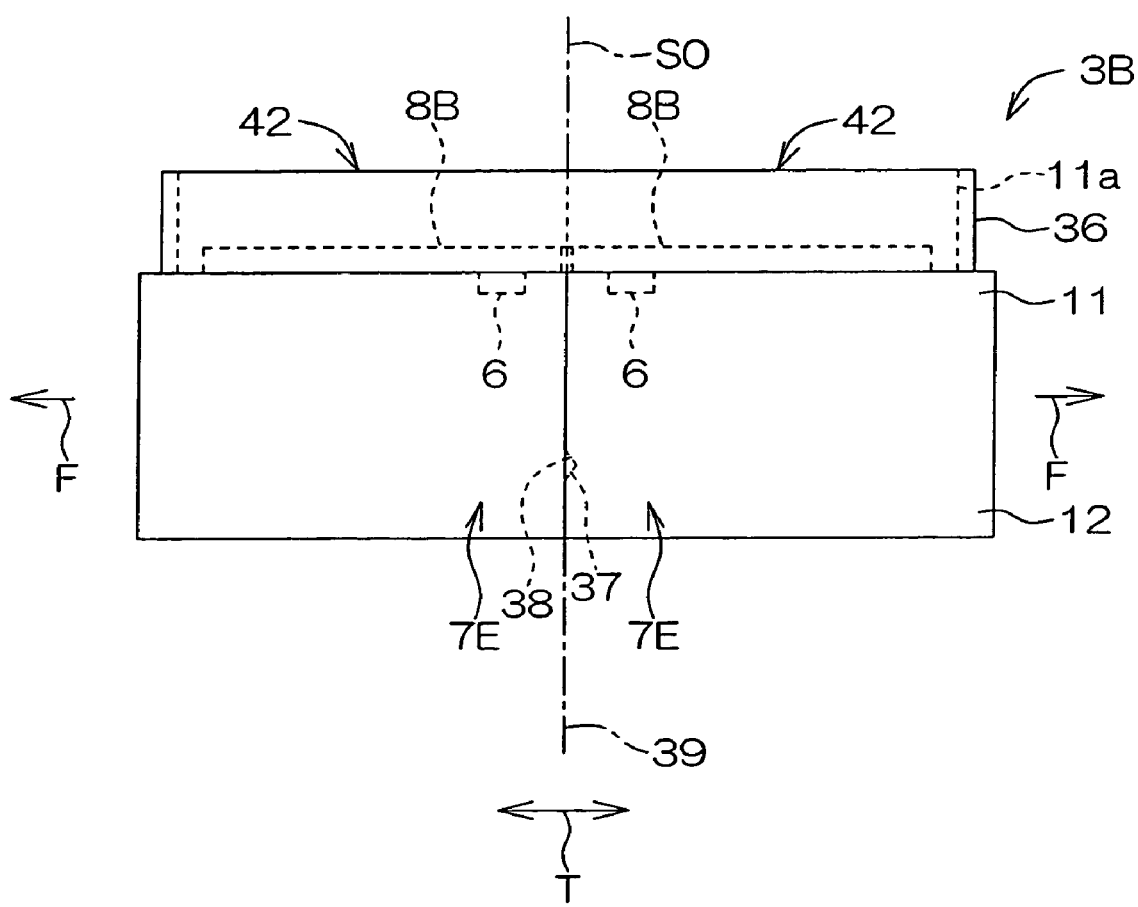
FIG. 19 is a front view of an indicator unit according to a seventh preferred embodiment of the present invention.
Figure 20:
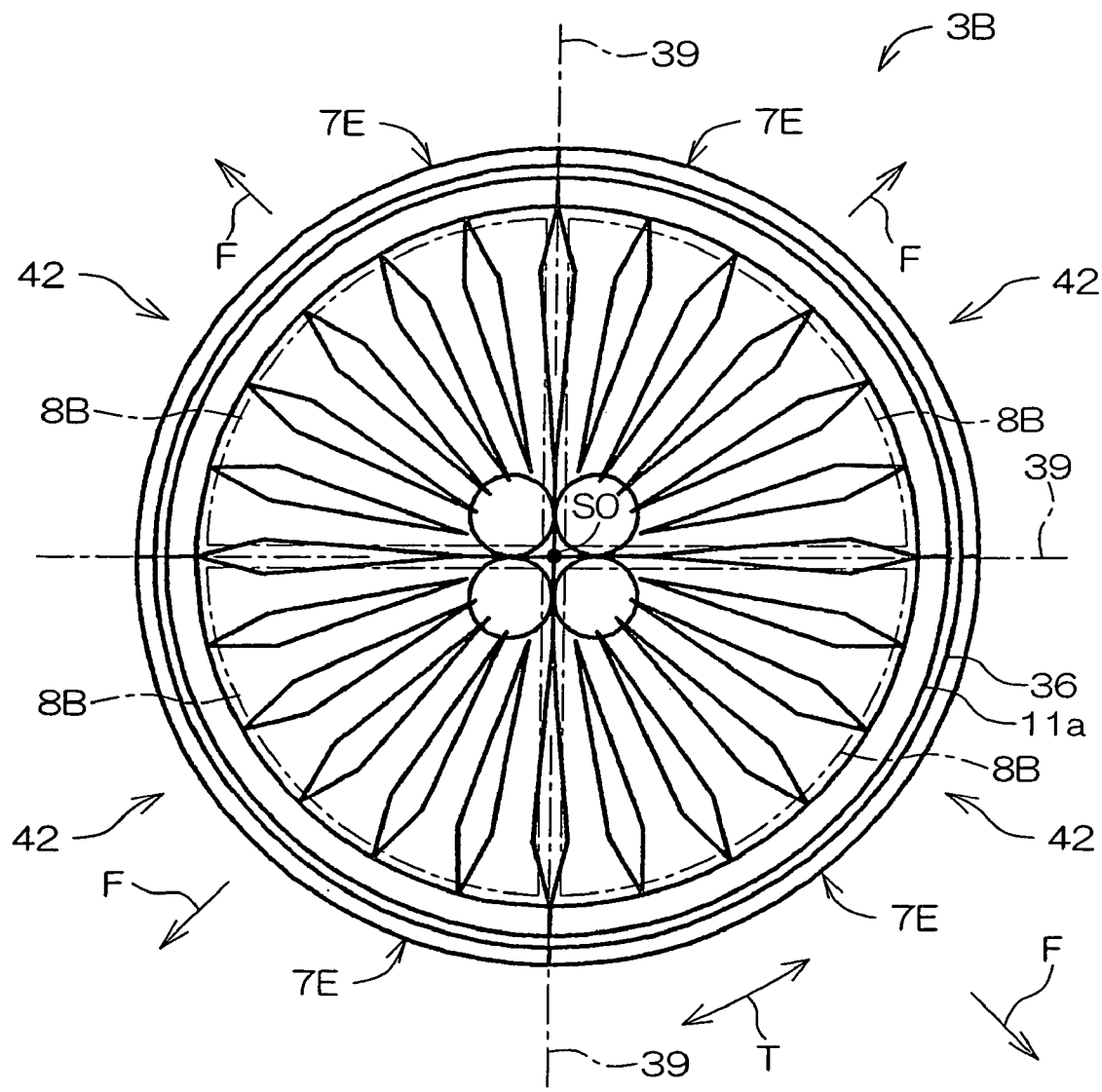
FIG. 20 is a plan view of the indicator unit shown in FIG. 19.

FIG. 19 is a front view of an indicator unit 3B according to a seventh preferred embodiment of the present invention. FIG. 20 is a plan view of the indicator unit 3B shown in FIG. 19.

The indicator unit 3B according to the seventh preferred embodiment has a plurality of indicator units 42 each serving as a sub-assembled body and a small unit. Each indicator unit 42 has an external shape of a divided body. Four indicator units 42 are joined together in the circumferential direction T to form the indicator unit 3B serving as a main assembled body and a large unit. The indicator unit 3B thus formed has a column shape and functions as in the case of the indicator unit 3B of the sixth preferred embodiment. The indicator unit 3B as the large unit may readily form the integrated post-like signal indicating light 1, by itself or by axially connecting, in stack, a plurality of indicator units 3B to one another.

Each indicator unit 42 has a single lens component 7E discussed in the sixth preferred embodiment, a single light source 6 and a single circuit substrate 8B for supporting the single light source 6.

The circuit substrate 8B is individually formed for each one of the lens component 7E, and has such sizes and shape as to be supported by the single lens component 7E, and supports the single light source 6.

Each indicator unit 42 has an external shape substantially the same as that of the single lens component 7E, and has a post-like shape, having a ¼-circle section in plan view, equivalent to the divided body mentioned earlier.

As coupling means for joining adjacent indicator units 42 together in the circumferential direction T, there are used the coupling means such as the annular member 36, the coupling portions 37, 38 and the like discussed in the sixth preferred embodiment.

An indicator unit (not shown) can be obtained, as a large unit in a divided body shape, by the indicator unit 42 as a single item or by connecting a plurality of indicator units 42 to one another in the circumferential direction T. Further, a signal indicating light in a divided body shape (not shown) can also readily be formed by the large unit in a divided body shape as a single item or by axially connecting the large units to one another in stack. For example, when two small units are connected to each other in the circumferential direction T, there can be formed a post-like signal indicating light having a semicircle section in plan view.

Figure 21:
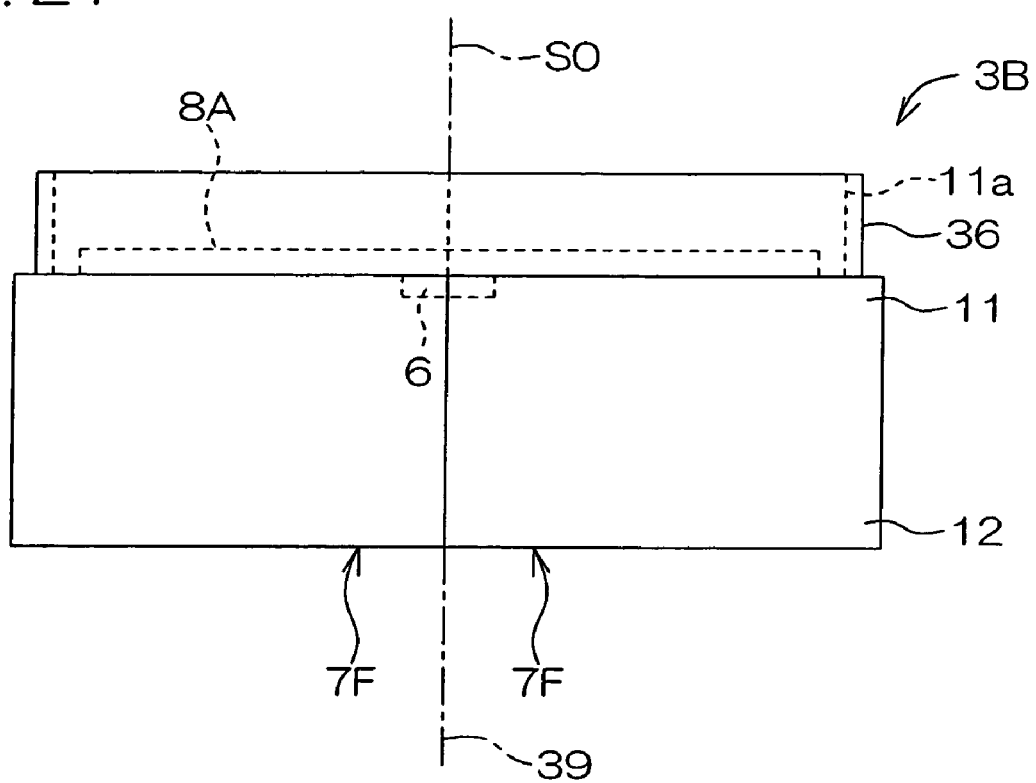
FIG. 21 is a front view of an indicator unit according to an eighth preferred embodiment of the present invention.
Figure 22:
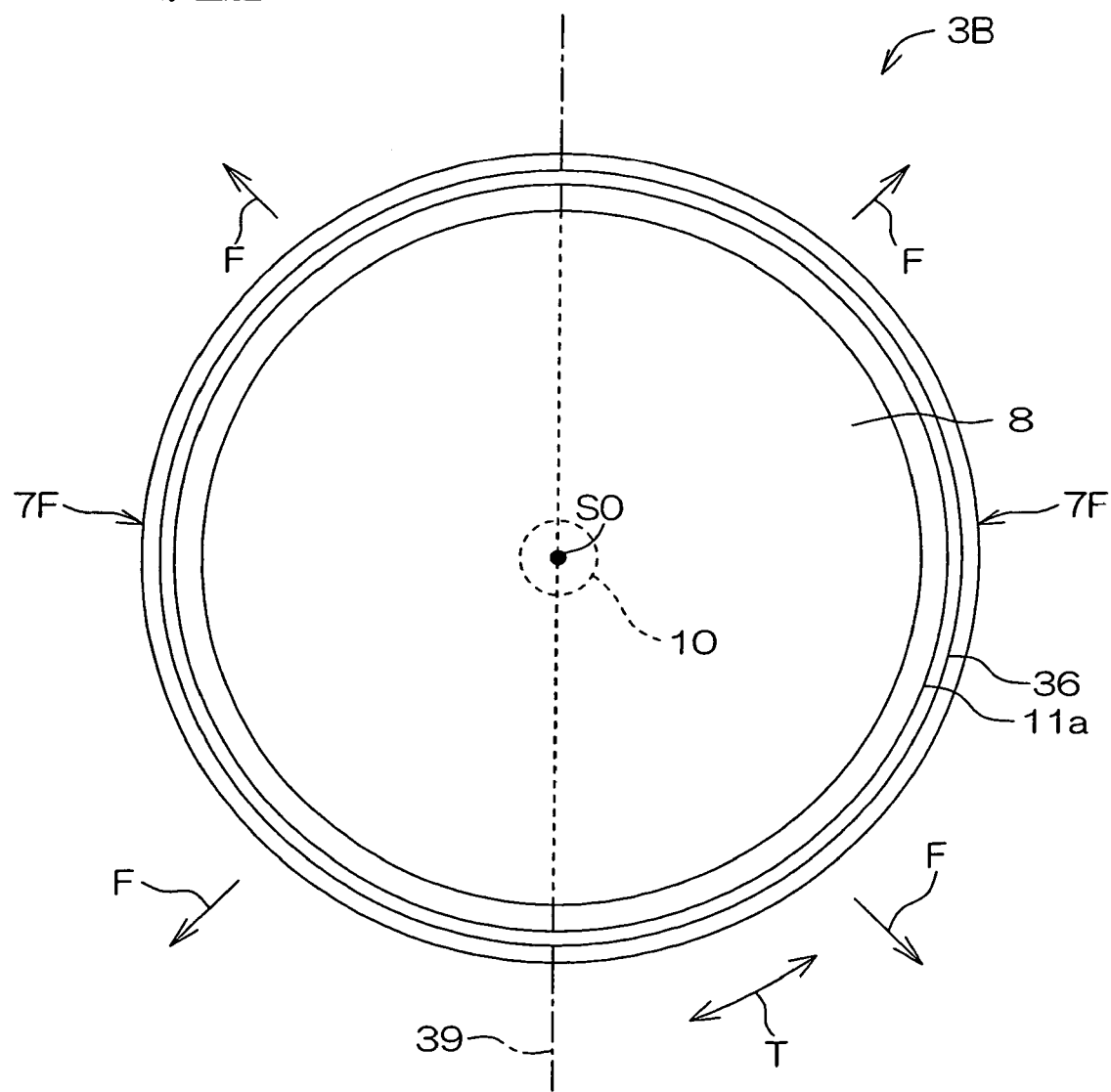
FIG. 22 is a plan view of the indicator unit shown in FIG. 21.
Figure 23:
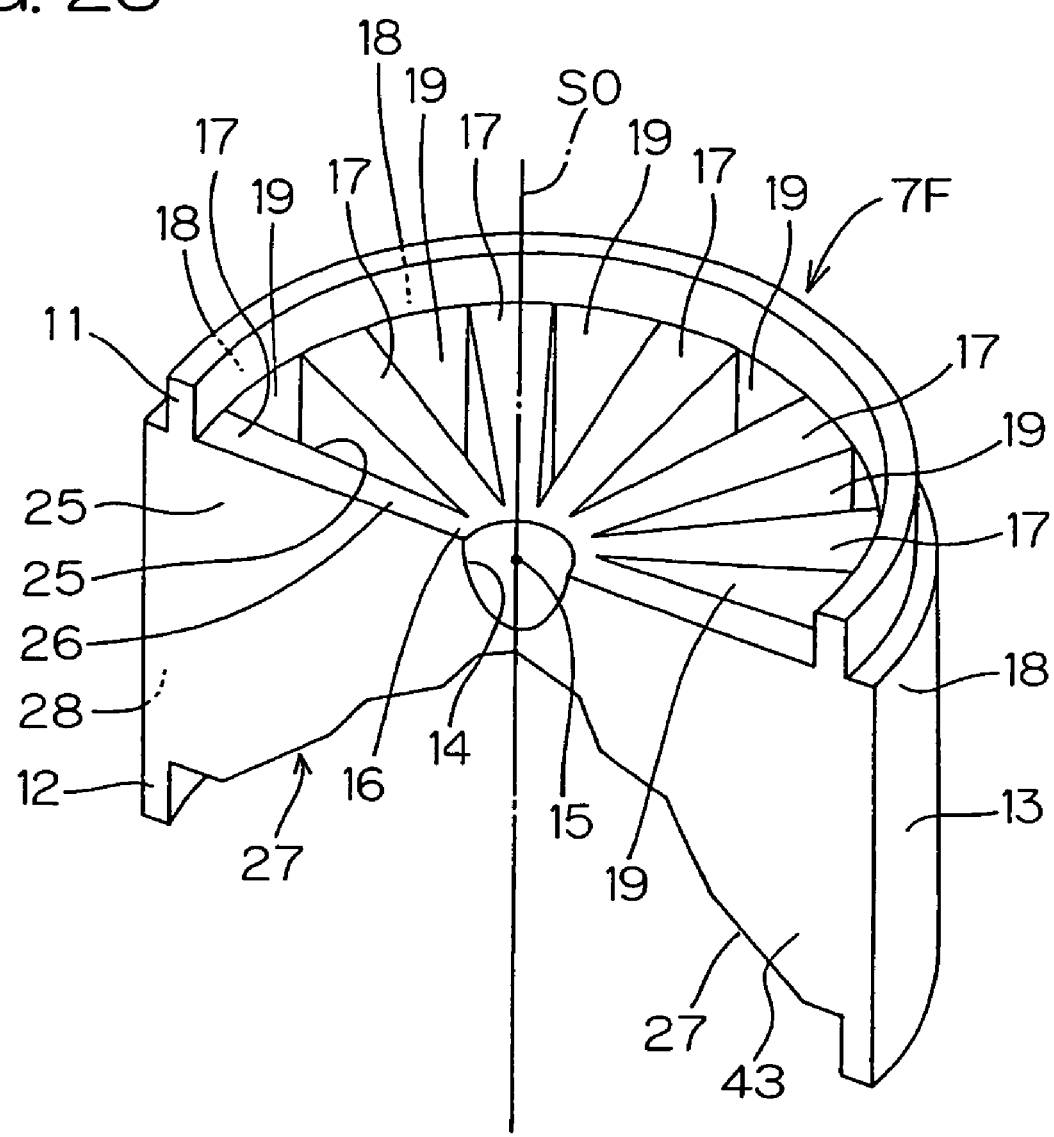
FIG. 23 is a perspective view of the lens component shown in FIG. 21.

FIG. 21 is a front view of an indicator unit 3B according to an eighth preferred embodiment. FIG. 22 is a plan view of the indicator unit 3B shown in FIG. 21. FIG. 23 is a perspective view of a lens component 7F of the eighth preferred embodiment.

As shown in FIGS. 21 and 22, the indicator unit 3B of the eighth preferred embodiment has two lens components 7F, a single light source 6 and a single circuit substrate 8. The light source 6 and the circuit substrate 8 are shared with the two lens components 7F.

As shown in FIGS. 22 and 23, each lens component 7F of the eighth preferred embodiment is formed in a divided body obtained by dividing, into two equal portions, the lens component 7 of the first preferred embodiment (See FIG. 3) by a dividing face 39 including the axis SO.

Each lens component 7F has an external shape of a divided body, i.e., a post-like shape having a semicircle section in plan view. More specifically, when a column body is circumferentially divided into two equal portions by the dividing face 39 including the axis (equivalent to the axis SO), two divided bodies having the same shape are obtained and each divided body has a semicircle section in plan view.

Each lens component 7F has an end face 43 included in the dividing face 39. That is, the end face 43 has two portions respectively formed at plate-like light guiding portions 17 at both ends. These two portions are continuously connected to each other to form a single plane face serving as the end face 43. The end face 43 serves as main surfaces and light guiding and reflecting surface of the plate-like light guiding portions 17 on which the end face 43 is formed.

The end faces 43 serve as coupling faces for joining the lens components 7F together in the circumferential direction T. Two lens components 7F are joined together with their end faces 43 coming in contact with each other.

A light source position 15 is formed on the dividing face 39 and is shared with the two joined lens components 7F.

The two lens components 7F in the divided body shape are joined together in the circumferential direction T with coupling means to form an assembled body. The assembled body has an external shape identical with that of the lens component 7 of the first preferred embodiment, and functions as in the case of the lens component 7. When the light source 6, the circuit substrate 8 and the like are attached to the assembled body, the indicator unit 3B is formed likewise in the first preferred embodiment. A signal indicating light 1 can be formed by axially connecting a plurality of indicator units 3B to one another.

In the eighth preferred embodiment, the coupling portions 37, 38 are not used as the coupling means, but these coupling portions may also be used.

As a ninth preferred embodiment, there may be considered, in the lens component 7 of the first preferred embodiment, a lens component (not shown) having a light incident portion 16 including a plurality of concave portions 14 as discussed in the second and fifth preferred embodiments, instead of the light incident portion 16 including the single concave portion 14.

In each of the first to ninth preferred embodiments discussed in the foregoing, the lens component 7, 7A, 7B, 7C, 7D, 7E, 7F and the like has a plurality of radial plate-like light guiding portions 17. In each of the second and third preferred embodiments, there are also disposed forked light guiding portion 32 serving as plate-like light guiding portions. This arrangement can not only collect and guide the light from the light source 6 in the emission directions F, but also direct the light in multiple directions. As a result, a high visibility can be obtained when the lens component is applied to the signal indicating light 1. Further, both the radial reflecting surfaces and the light guiding and reflecting surfaces are integrally formed on the plate-like light guiding portions 17. This reduces the number of component elements, and therefore contributes to improvement in the reliability of the signal indicating light 1.

In each of the first to fourth, eighth and ninth preferred embodiments, a plurality of radial reflecting faces 29 are disposed in the form of stairs. According to this arrangement, light from the light source 6 can be emitted from a plurality of portions of the lens component, thus contributing to improvement in visibility.

In each of the first to third, and fifth to ninth preferred embodiments, the joint portions 18 are formed. This arrangement not only reinforces the lens component, making it easier to handle the same, but also facilitates the production of the lens component by resin molding.

In each of the second, third, fifth and ninth preferred embodiments, the lens component has a plurality of light source positions 15. In each of the sixth and seventh preferred embodiments, the indicator unit 3B has a plurality of light source positions 15. According to the arrangement above-mentioned, the visibility of a light signal of the indicator unit 3B and consequently the signal indicating light 1, can be increased by a large light amount from a plurality of light sources 6. Further, a practical light amount can economically be obtained. Further, in each of the second, third, fifth and ninth preferred embodiments, the light sources 6 can commonly be disposed on the single plane P1, enabling the indicator unit 3B to be readily assembled.

In each of the first to ninth preferred embodiments, both the plate-like light guiding portions and the light guiding and reflecting surfaces include total-reflection faces, thus enhancing the visibility.

In each of the first to ninth preferred embodiments, the signal indicating light 1 and the indicator unit 3B therefore can achieve not only the improvement in visibility as the operational effect of the lens component, but also the reduction in the number of component elements.

In the indicator unit 3B of each of the sixth to eighth preferred embodiments, a plurality of lens components 7E, 7F each in a divided-body shape are joined together in the circumferential direction T. Accordingly, a large indicator unit 3B can be formed with the use of small lens components 7E, 7F. The production cost can be reduced with the use of small lens components 7E, 7F. Further, the use of the coupling means makes it easier to handle the indicator unit 3B when assembling the signal indicating light 1.

In each of the first to sixth, eighth and ninth preferred embodiments, the indicator unit 3B has an external shape of a column body. Accordingly, the column-shape signal indicating light 1 can readily be formed by the indicator unit 3B by itself or by axially connecting, in stack, a plurality of indicator units 3B to one another.

According to the seventh preferred embodiment, the indicator unit 42 has an external shape of a divided body. It is therefore possible to readily form a post-like signal indicating light 1 or a signal indicating light in a divided-body shape.

In each of the first to ninth preferred embodiments, the outer periphery 13 of the lens component is smooth. Accordingly, the outer periphery 13 is hardly contaminated, thus contributing to improvement in visibility.

In addition to the preferred embodiments above-mentioned, the following modifications may be considered.

For example, in each of the sixth and seventh preferred embodiments, a plurality of light source positions 15 maybe disposed for each lens component 7E.

In each of the second and third preferred embodiments, each forked light guiding portion 32 is branched into two portions at the tip thereof at the light incident side. However, each forked light guiding portion 32 may be branched into two portions at the tip thereof at the light emission side (not shown).

In each of the preferred embodiments above-mentioned, at least a portion of the main surfaces 25 may be formed by a curved surface which curved in plan view and extends substantially in the axial direction.

In each of the preferred embodiments above-mentioned, the arrangement of the plurality of plate-like light guiding portions 17 is not limited to the layout in which the plate-like light guiding portions 17 extend radically in plan view. For example, the plate-like light guiding portions 17 may extend inclined as crossing the radial directions, or may extend in a radically outwardly curved manner.

In each of the preferred embodiments above-mentioned, the lens component may be provided on portions of the surfaces thereof with reflecting members such as aluminum deposited films or the like. The reflecting members are formed on at least portions of the surfaces serving as reflecting faces, preferably on the surfaces in their entirety.

In each of the preferred embodiments above-mentioned, each space 19 may be filled with a member made of a material having density higher than that of the lens component material. According to the arrangement above-mentioned, light can more easily be total-reflected by the main surfaces 25. Similar modification may also be considered with respect to any of other preferred embodiments.

In each of the preferred embodiments above-mentioned, the feeding members are disposed in spaces 19. However, the feeding members may be disposed along first end faces 26.

In each of the preferred embodiments above-mentioned, each second end face 27 may include only a single curved or flat radial reflecting face 29.

In each of the preferred embodiments above-mentioned, the light incident portion 16 may have a flat incident face.

In each of the preferred embodiments above-mentioned, the outer periphery 13 of the lens component maybe undulated (not shown). The undulation serves as a diffusing lens for diffusing the transmitted light. Further, at least one of the connecting faces 30 and the main surfaces 25 may be undulated (not shown). The undulation includes for example minute concaved and convexed portions which diffusely reflect the light, causing the same to be diffused.

In each of the first to fourth and eighth preferred embodiments, the axis SO passes through the light source position 15. On the other hand, in each of the fifth to seventh and ninth preferred embodiments, the axis SO which is the center of the radial layout of the plurality of plate-like light guiding portions 17, is located in the vicinity of the light source positions 15 and passes through a position shifted from the light source positions 15. It is sufficient that the axis SO as the layout center passes through the light source position or a position in the vicinity thereof.

In each of the sixth to eighth preferred embodiments, each lens component 7E, 7F has a basic external shape equivalent to one of divided bodies obtained by equally dividing a post-like member in the circumferential direction T. However, the basic external shape of each lens component 7E, 7F is not limited to that above-mentioned. For example, the post-like member may not be equally divided in the circumferential direction T, or may be divided by other number than two and four. Further, the post-like member may have other sectional shape than a circle. It is sufficient that the axis of the post-like member is parallel to the predetermined axis. Thus, each lens component may have a basic external shape equivalent to one of the divided bodies obtained by dividing a post-like member of which axis is parallel to the predetermined axis, into a plurality of portions in the circumferential direction T. The division in the circumferential direction T includes a division in which the dividing face includes the axis of a post-like member, and also includes a division in which the dividing face does not include the axis of the post-like member but extends in the axial direction thereof, and also includes a division in which the normal line of the dividing face is inclined with respect to the axis of the post-like member. That is, it is sufficient that the divided bodies are arranged in the circumferential direction T.

In each of the first to fourth, fifth and ninth preferred embodiments, the external shape of the lens component is a column body as a body of revolution around the axis SO. However, the external shape of the lens component is not limited to such a column body, but may be for example a post-like body having a polygonal section. The axis of the post-like body passes through the center of the polygonal section and is at right angles thereto. Examples of the applicable basic external shape of the lens component may also include other body of revolution than a column body, e.g., a spherical or conical body. Examples of the divided body as discussed in each of the sixth to eighth preferred embodiments, may include a divided body which is a portion of a body of revolution as mentioned earlier and which is obtained by dividing a post-like body by a dividing face extending in the axial direction, and may also include a divided body which is a portion of a post-like body having a polygonal section and which is obtained by dividing the post-like body by a dividing face extending in the axial direction.

In each of the first to fourth preferred embodiments, it may be considered that each of the plate-like light guiding portions 17 of the lens component has a single radial reflecting face 29. In each of the second, third, fifth to ninth preferred embodiments, it may be considered that the joint portions 18 are omitted in the lens component. Further, in each of the preferred embodiments above-mentioned, it may be considered that the light guiding and reflecting surfaces, the radial reflecting surfaces and the like in the lens component, are so arranged as not to totally reflect the light.

In each of the preferred embodiments above-mentioned, the light source 6 may be an LED in which a plurality of light emitting element chips are being disposed in close vicinity to one another in a single case. Examples of such an LED include a multi-color light emitting LED arranged such that a plurality of incorporated light emitting element chips emit different-color lights.

When a plurality of light sources 6 are disposed, there may be included light sources for emitting lights in different colors, and there may be disposed a changeover circuit (not shown) serving as switching means for selectively emitting light from the plurality of light sources. According to this arrangement, a different color light may selectively be emitted.

In the indicator unit 3B of the first preferred embodiment, it may be considered to dispose a colored glove (not shown) formed independently from the lens component 7 and arranged to cover the same. Without change in the lens component 7 or the light source 6, the color of emitted light can be changed dependent on the glove. Similar modification may be considered for any of other preferred embodiments.

As the light source 6, there may be utilized an EL (electroluminescence) element or the like, in addition to an LED.

In the eighth preferred embodiment, each indicator unit 42 has a basic external shape equivalent to one divided body obtained by equally dividing a post-like body in the circumferential direction T. However, the basic external shape of each indicator unit 42 is not limited to that above-mentioned. For example, the post-like body may not equally be divided in the circumferential direction T.

The indicator unit 3B may have a single lens component and a single light source 6 as in each of the first, fourth and seventh preferred embodiments, or may have a single lens component and a plurality of light sources 6 as in each of the second, third and fifth preferred embodiments, or may have a plurality of lens components 7F and a single light source 6 as in the eighth preferred embodiment, or may have a plurality of lens components 7E and a plurality of light sources 6 as in the seventh preferred embodiment. Further, it may be considered to dispose a light source only at a portion of a plurality of light source positions set in the lens component. It is sufficient to include at least one lens component and at least one light source.

It is sufficient that the signal indicating light includes at least one indicator unit 3A, 3B, 3C. When at least one of the cover 2 and the base unit 4 is eliminated, it may be considered that at least one of the cover 2 and the base unit 4 is formed in a unitary structure with one of the indicator unit 3A, 3B, 3C. In such a case, it may be considered that the signal indicating light is formed by a single indicator unit.

A plurality of indicator units 3A, 3B, 3C may be separable joined together, or may be fixedly joined together in an undetachable manner. When joining a plurality of indicator units 3B, 42 together, it is sufficient to join them together at least in one direction of the axial direction and the circumferential direction T. For example, in each of the first to sixth and eighth preferred embodiments, the joining direction is only the axial direction. In the seventh preferred embodiment, the joining directions are both the axial direction and the circumferential direction T. In the seventh preferred embodiment, when the signal indicating light 1 has only the single indicator unit 3B, the plurality of indicator units 42 are joined together only in the circumferential direction T.

The external shape of the signal indicating light 1 may be any of a variety of shapes likewise in the indicator unit. For example, the signal indicating light 1 may be a post-like body having a polygonal section, a body of revolution, or a divided body obtained by dividing a post-like body or a body of revolution in the circumferential direction T around the axis SO. For example, the signal indicating light 1 may be a column body, a post-like body having a square section, or a post-like body having a semicircle section.

Preferred embodiments of the present invention have been discussed in detail, but these embodiments are mere specific examples for clarifying the technical contents of the present invention. Therefore, the present invention should not be construed as limited to these specific examples. The spirit and scope of the present invention are limited only by the appended claims.

The invention claimed is:

1. A signal indicating light indicator unit (3A-3C, 42) comprising:
   a lens component (7, 7A-7C, 7F) comprising:
      a light incident portion (16) having an incident face (14) upon which light from a light source (6) is incident, the light source (6) being disposed at a single predetermined light source position (15); and
      a plurality of plate-like light guiding portions (17, 32) extending radially outward from a predetermined axis (SO) passing through the single light source position (15) or a position in the vicinity thereof and arranged to guide light incident from the incident face (14) of the light incident portion (16), in radial emission directions (F, F1-F3) intersecting the predetermined axis (SO), and wherein each of the plate-like light guiding portions (17, 32) is provided on an end face (27) with a radial reflecting face (29, 29A, 29B) for internally reflecting in the radial emission directions (F, F1-F3), the light incident from the incident face (14) of the light incident portion (16), each of the plate-like light guiding portions (17, 32) has a pair of main surfaces (25) serving as a pair of light guiding and reflecting surfaces which extend substantially and parallel to the predetermined axis (SO) and for guiding, as internally reflecting the light incident from the incident face (14) in the radial emission directions (F, F1-F3), light from an outer periphery (13) of said plurality of plate-like guiding portions is radially emitted in said radial emission direction, a single light source (6) is disposed at the single light source position (15) of the lens component (7, 7A-7F), and said light incident face (14) comprises a concave portion and said single predetermined light source position (15) is provided in said concave portion.

2. The signal indicating light indicator unit (3A-3C, 42) according to claim 1, wherein each radial reflecting face (29) includes a plurality of radial reflecting faces (29) made in a form of stairs and forming total-reflection surfaces.

3. The signal indicating light indicator unit (3A-3C, 42) according to claim 1, further comprising a plurality of joint portions (18) each of which connects radial outer edges of adjacent two plate-like light guiding portions (17, 32) to each other to form a three dimensional geometric surface.

4. The signal indicating light indicator unit (3A-3C, 42) according to claim 1, wherein said outer periphery (13) of said plurality of plate-like guiding portions (17, 32) is provided in a cylindrical shape.

* * * * *